US011700672B2

(12) United States Patent
Hamidi-Sepehr et al.

(10) Patent No.: US 11,700,672 B2
(45) Date of Patent: Jul. 11, 2023

(54) PER-SPAN PDCCH MONITORING ENHANCEMENTS

(71) Applicant: Intel Corporation, Santa Clara, CA (US)

(72) Inventors: Fatemeh Hamidi-Sepehr, Santa Clara, CA (US); Debdeep Chatterjee, San Jose, CA (US); Sergey Panteleev, Nizhny Novgorod (RU); Toufiqul Islam, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 17/064,106

(22) Filed: Oct. 6, 2020

(65) Prior Publication Data

US 2021/0037607 A1    Feb. 4, 2021

Related U.S. Application Data

(60) Provisional application No. 62/976,680, filed on Feb. 14, 2020, provisional application No. 62/933,240, (Continued)

(51) Int. Cl.
*H04W 72/04* (2023.01)
*H04W 88/10* (2009.01)
(Continued)

(52) U.S. Cl.
CPC .......... *H04W 88/10* (2013.01); *H04L 5/0094* (2013.01); *H04W 8/24* (2013.01); *H04W 24/08* (2013.01);
(Continued)

(58) Field of Classification Search
CPC .......... H04W 72/0446; H04W 72/042; H04W 72/1289; H04W 76/27; H04W 88/10;
(Continued)

(56) References Cited

U.S. PATENT DOCUMENTS

| | | | | |
|---|---|---|---|---|
| 2013/0294318 A1* | 11/2013 | Amerga | ............... | H04W 72/005 370/312 |
| 2021/0022122 A1* | 1/2021 | Khoshnevisan | ...... | H04L 5/0053 |
| 2021/0329647 A1* | 10/2021 | Park | .................... | H04W 72/005 |

OTHER PUBLICATIONS

"5G; NR; Radio Resource Control (RRC); Protocol specification", ETSI TS 138 331 V15.3.0, (Oct. 2018), 441 pgs.
(Continued)

*Primary Examiner* — Wei Zhao
(74) *Attorney, Agent, or Firm* — Schwegman Lundberg & Woessner, P.A.

(57) ABSTRACT

Systems and methods for PDCCH monitoring in NR systems. The UE provides to a serving cell UE capability information indicating a capability of the UE to monitor PDCCH. The UE capability information indicates a carrier aggregation capability larger than multiple serving cells and has a maximum number indication for a maximum number of PDCCH candidates that the UE can monitor per span. The serving cell transmits an RRC message to a UE in response to the UE capacity information. The RRC message has a per-slot and/or per-span indication to monitor PDCCHs on the serving cell for a maximum number of PDCCH candidates and non-overlapping CCEs. The UE monitors PDCCH candidates and, in the event that a span contains larger than a maximum number of PDCCH candidates or non-overlapping CCEs across multiple served cells, determines whether to monitor a particular PDCCH candidate in the span.

20 Claims, 5 Drawing Sheets

Related U.S. Application Data filed on Nov. 8, 2019, provisional application No. 62/911,965, filed on Oct. 7, 2019.

(51) Int. Cl.
    *H04W 8/24*         (2009.01)
    *H04W 24/08*       (2009.01)
    *H04L 5/00*          (2006.01)
    *H04W 72/0446*     (2023.01)
    *H04W 76/27*       (2018.01)
    *H04W 72/23*        (2023.01)

(52) U.S. Cl.
    CPC ....... *H04W 72/0446* (2013.01); *H04W 72/23* (2023.01); *H04W 76/27* (2018.02)

(58) Field of Classification Search
CPC ..... H04W 24/08; H04W 8/24; H04W 72/044; H04W 72/128; H04L 5/0094; H04L 5/0051; H04L 5/009
See application file for complete search history.

(56) References Cited

OTHER PUBLICATIONS

"3GPP TS 38.306 V15.10.0", 3rd Generation Partnership Project;Technical Specification Group Radio Access Network;NR;User Equipment (UE) radio access capabilities(Release 15), (Jul. 2020), 66 pgs.
"3GPP TR 38.822 V15.0.1", 3rd Generation Partnership Project;Technical Specification Group Radio Access Network;NR;User Equipment (UE) feature list(Release 15), (Jul. 2019), 64 pgs.
"ETSI TS 138 213 V15.3.0", 5G;NR;Physical layer procedures for control(3GPP TS 38.213 version 15.3.0 Release 15), (Oct. 2018), 102 pgs.

* cited by examiner

PER-SPAN PDCCH MONITORING ENHANCEMENTS

PRIORITY CLAIM

This application claims the benefit of priority to U.S. Provisional Patent Application Ser. No. 62/911,965, filed Oct. 7, 2019, U.S. Provisional Patent Application Ser. No. 62/933,240, filed Nov. 8, 2019, and U.S. Provisional Patent Application Ser. No. 62/976,680, filed Feb. 14, 2020, each which is incorporated herein by reference in its entirety.

TECHNICAL FIELD

Embodiments pertain to new radio (NR)/fifth generation (5G) systems. Some embodiments relate to downlink transmissions in NR systems. Some embodiments relate to physical downlink control channel (PDCCH) transmissions.

BACKGROUND

The use of various types of communication systems such as 3GPP networks, has increased due to both an increase in the types of devices user equipment (UEs) using network resources as well as the amount of data and bandwidth being used by various applications, such as video streaming, operating on these UEs. The next generation wireless communication system will provide ubiquitous connectivity and access to information, as well as ability to share data, by various users and applications. NR systems are expected to have a unified framework in which different and conflicting performance criteria and services are to be met. In general, NR systems will evolve based on 3GPP LTE-Advanced technology with additional enhanced radio access technologies (RATs) to enable seamless wireless connectivity solutions. An increasing number of these solutions involve the issue of a massive increase in the number of UEs, causing various new issues to be resolved as well as enhancements to the communications of the UEs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
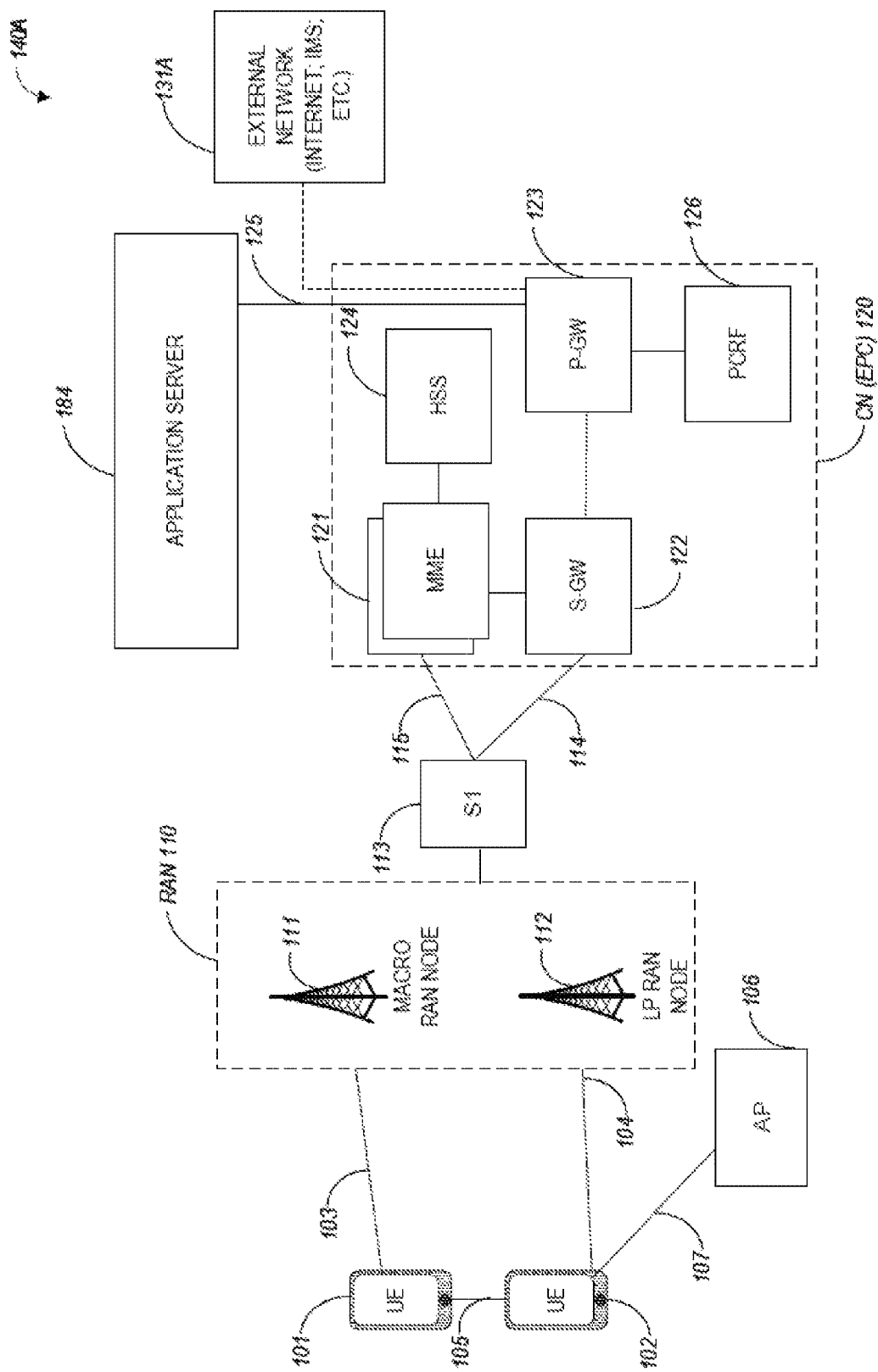
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform. e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018 December). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
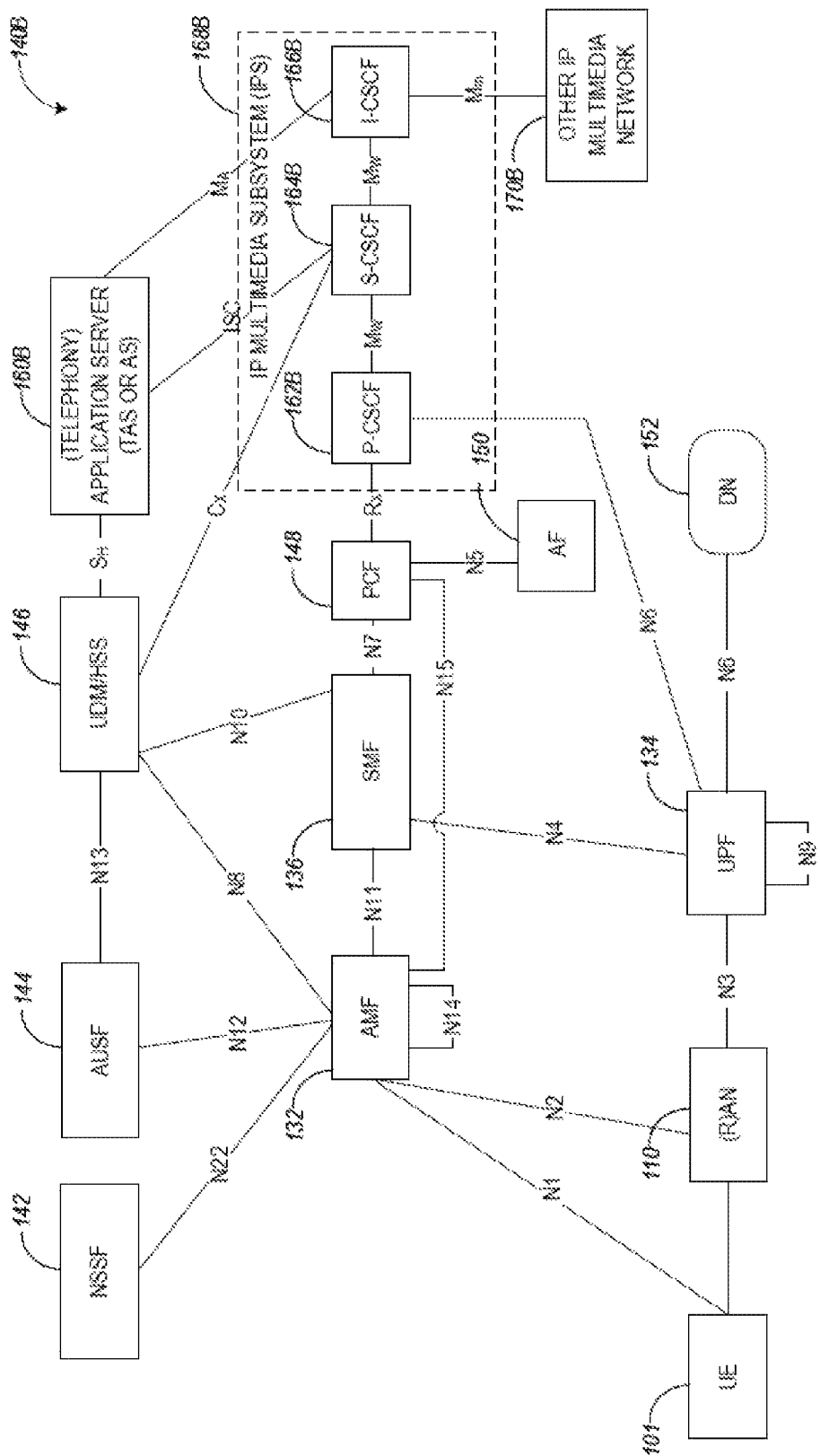
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically. UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown). N16 (between two SMFs, not shown), and N22 (between AMF 132 and NSSF 142, not shown). Other reference point representations not shown in FIG. 1E can also be used.

Figure 1C:
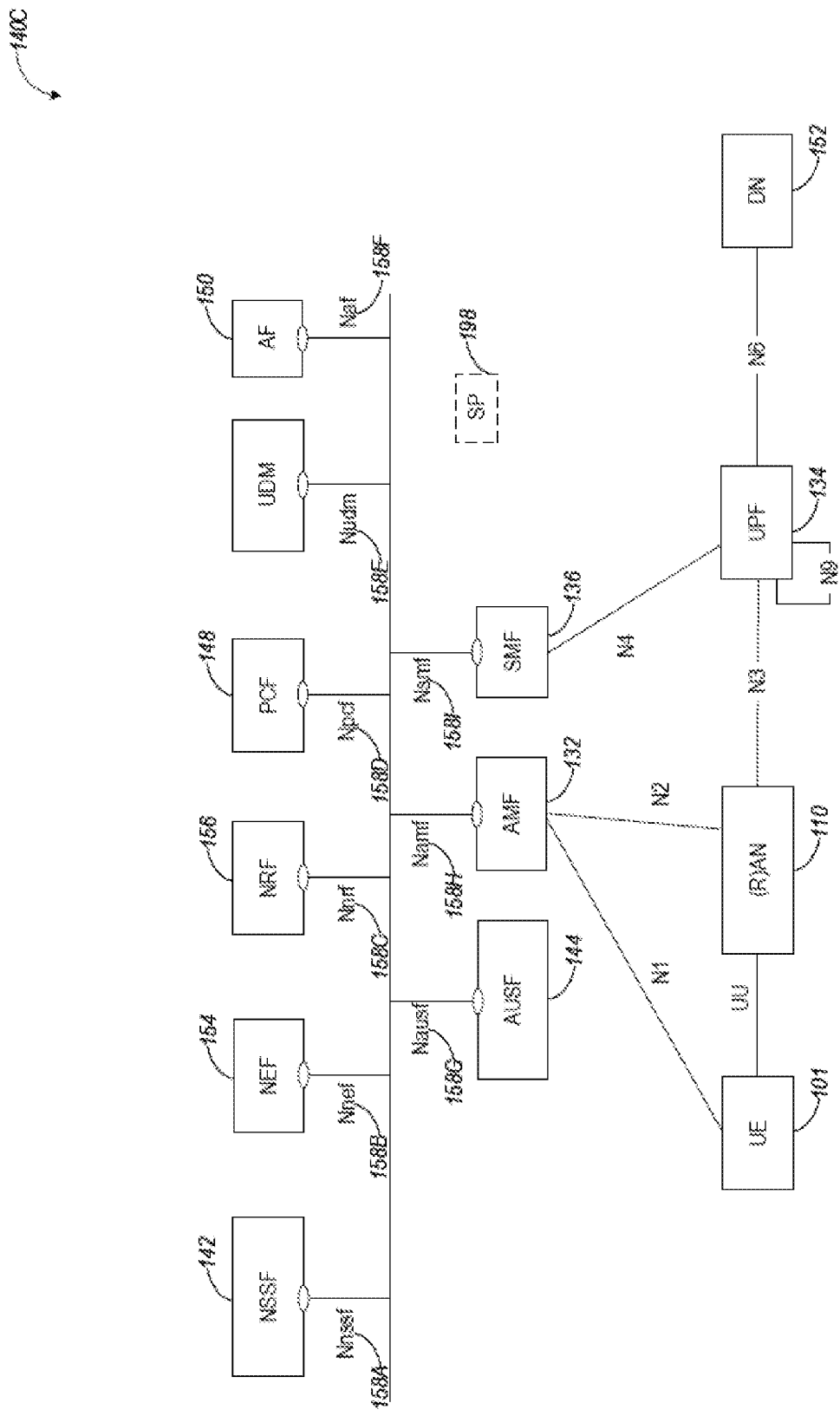
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
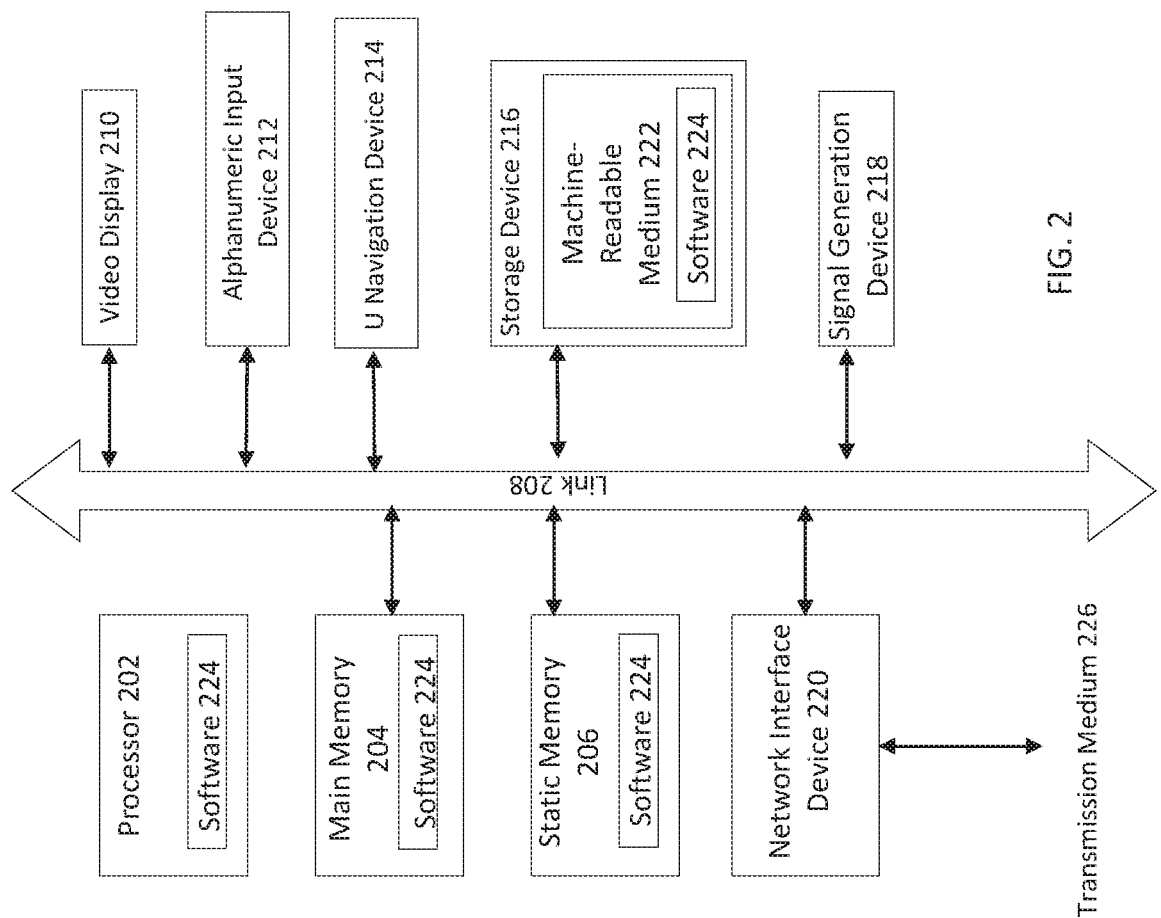
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

As indicated above, the explosion of network use has engendered the creation of a number of different UEs as well as different types of services for the different UEs. In order to support ultra-reliable low-latency communication (URLLC) services, which target 1 ms latency and 99.999% reliability, control and shared channels should employ advanced transmission schemes which maximize diversity and energy within a very short transmission interval. In that sense, reliability of physical downlink control channel (PDCCH) is critical to provide both DL and UL operation. Recently, support of 16 control channel elements (CCE) per decoding candidate was agreed that brings improved coverage for the considered enhanced mobile broadband (eMBB) use cases. However, in order to efficiently support URLLC requirements, further enhancements to NR PDCCH and DCI format designs are expected. Accordingly, various methods related to PDCCH monitoring enhancements are disclosed to increase scheduling opportunity flexibility, as well as better adapt to different traffic patterns and requirements, especially corresponding to URLLC services.

In NR, support of multiple PDCCH monitoring occasions within a slot is considered (in addition to the PDCCH monitoring occasion(s) in the first three symbols of a slot), as an optional UE capability (see feature group (FG) 3-5b in 3GPP TS 38.306 "User Equipment (UE) radio access capabilities (Release 15)," 3GPP TS 38.331, "Radio Resource Control (RRC) protocol specification (Release 15)," 3GPP TR 38.822 "User Equipment (UE) feature list (Release 15)" herein incorporated by reference in their entireties for exact definition and constraints). As above, each of 3GPP TS 38.331 v.16.1.0 and 3GPP TS 38.306 v16.2.0 is herein incorporated by reference in its entirety. Basically, a minimum time separation of X Orthogonal Frequency Division Multiplexing (OFDM) symbols is used between the start of two spans, where each span is of length up to Y consecutive OFDM symbols in which PDCCH is configured to be monitored. Further, certain downlink control information (DCIs) can be processed for the set of monitoring occasions which are within the same span, with limitations on the number of different start symbol indices of spans for all PDCCH monitoring occasions per slot, and number of PDCCH monitoring occasions per slot. As such, the UE may also be configured with multiple monitoring occasions beyond the first 3 symbols. Further, the L1 control information to be handled, includes parallel triggering for unicast data transmission (physical downlink shared channels (PDSCHs) or physical uplink shared channels (PUSCHs)), as well as common control and broadcast with the group PDCCHs.

One motivation behind supporting such capability is to maintain a cap on UE processing load for PDCCH monitoring over a slot by capping the number of PDCCHs the UE may expect within a slot duration. As such, the concept of monitoring span and span gap have been developed, referring to certain monitoring opportunities where the UE is configured to monitor for PDCCH(s).

In this regard, the UE indicates its capability to monitor for PDCCH multiple times within a slot, with a gap of at least a certain number of symbols between the monitoring times being present. This capability imposes certain scheduling constraints, and may be based on how the UE's firmware can handle the control flow, e.g., in terms of receiving grants, and being able to perform the consequent processing. As mentioned earlier, such capability definition places a cap on the UE processing demand since otherwise the UE handles control information flow arriving at any and every time within the slot.

URLLC services introduce new requirements as well as new traffic profiles and scheduling characteristics. Accordingly, enhancements may be used to better adapt to such characteristics and requirements. PDCCH monitoring enhancements can help realizing such adaptations, e.g., to achieve more flexibility in scheduling opportunities. Rel-16 foreseen use cases may be present for which the Rel-15 requirements may not be adequate. Certainly, increased capabilities in numbers of blind decodings (BDs) or numbers of CCEs for channel estimation can straightforwardly improve scheduling flexibility. However, this also incurs significant UE complexity and power consumption. The UE dimensions the control processing in terms of potential PDCCH monitoring enhancements, e.g., in terms of the maximum numbers of BDs/CCEs for channel estimation. Thus, it is desirable to achieve an optimal balance between scheduling flexibility and improved blocking performance against UE complexity and power consumption.

Maximum Number of BDs/Non-Overlapping CCEs:

In Release 16 (and beyond) of the NR specification, an explicit limitation on the maximum number of non-overlapping CCEs and possibly for the maximum number of BDs over PDCCH monitoring spans is likely to be specified. In Rel-15 NR, PDCCH monitoring did not consider the aspects related to the maximum number of BDs/CCEs for channel estimation, and in Release 15 of NR specification, such characterizations are defined on a per slot basis (i.e., there is no relationship with respect to shorter durations like the monitoring span, etc.).

In terms of the co-existence of span-based monitoring requirements, with slot-level (Rel-15) constraints, how the configuration of Rel-15 requirements vs. enhanced requirements are defined should be considered. In order to support enhanced PDCCH monitoring in Rel-16 and beyond, 3GPP has agreed to down-select between the following two options:

Option 1: PDCCH monitoring based on Rel-15 capability for eMBB and PDCCH monitoring based on Rel-16 capability for URLLC can be configured to a UE on the same carrier UE monitors PDCCH for eMBB following reported Rel-15 capability, and monitors PDCCH for URLLC following reported Rel-16 capability For Rel-16 PDCCH monitoring capability, the limit C on the maximum number of non-overlapping CCEs for channel estimation per PDCCH monitoring span is the same across different spans within a slot. Each span for Rel-16 PDCCH only cover UE specific search space (USS) for URLLC (FFS for common search space (CSS))

Option 2: PDCCH monitoring for both eMBB and URLLC can be configured based on either Rel-15 capability or Rel-16 capability gNB configures which capability is used Accordingly, in Option 1, PDCCH monitoring requirements of Rel-15 and Rel-16 apply simultaneously (by tagging and separation of PDCCH candidates at the control resource set (CORESET), or synchronization signal (SS) set, or DCI format-level, and pulling-in resources from carrier aggregation (CA) capability), while in Option 2, PDCCH monitoring requirements may be switched between Rel-15 and Rel-16 monitoring configurations via radio resource control (RRC) signaling.

The different characterizations to enable switching between the two requirements as captured under Option 2, above, is described. Note that, in this disclosure, for convenience and compact presentation, the terminology "BDs/CCEs" is used to imply "numbers of BDs and/or numbers of non-overlapping CCEs". However, it is not necessarily implied that the requirements on numbers of BDs and numbers of non-overlapping CCEs may be enhanced simultaneously or even follow the same approaches/characterizations.

For the purpose of enhanced BD/CCE budget characterization, PDCCH monitoring span follows the definition in UE feature group 3-5b as a starting point, in which: "There is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0<=l<=13 is generated, where b(l)=1 if symbol l of any slot is part of a monitoring occasion, b(l)=0 otherwise. The first span in the span pattern begins at the smallest l for which b(l)=1. The next span in the span pattern begins at the smallest l not included in the previous span(s) for which b(l)=1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary."

Further, (2, 2) (4, 3) (7, 3) combinations of (X, Y) defined in UE feature 3-5b are supported as the combination (X, Y) for Rel-16 PDCCH monitoring capability on the per-CC limit on the maximum number of non-overlapping CCEs for URLLC, while combinations (2, 1) (4, 1) (4, 2) (7, 1) (7, 2) are not additionally introduced for this purpose. The UE reports the supported combinations per sub-carrier Spacing (SCS), where combination (2, 2)(4, 3)(7, 3) are applicable for (at least) SCS of 15 kHz and 30 kHz. A combination is valid if the span pattern satisfies X and Y of the given combination in every slot, including cross slot boundary.

The embodiments and examples herein are applicable to configuration switching between any two sets of monitoring requirements, and is not limited to switching between Rel-15 (slot-based) and Rel-16 (span-based) requirements.

Overbooking/Dropping Rules to Maintain UE BD and CCE Requirements:

In Release 15 specifications, mapping and dropping rules have been defined such that if, in a slot, the number of PDCCH BD candidates or the number of CCEs for channel estimation exceed the corresponding minimum requirements, the UE drops the current and all subsequent search space sets configured to be monitored in that slot, wherein the mapping of the search space sets follow in ascending order of the search space set ID (SS_ID) [3GPP TS 38.213, "Physical layer procedures for control (Release 15)", clause 10 and subclause 10.1]. Note that 3GPP TS 38.213 v.16.2.0 is herein incorporated by reference in its entirety. This can result in an entire search space set being dropped even if a single candidate in the search space set results in the total number of BDs or CCEs for channel estimation to exceed the corresponding specified minimum requirements. This may lead to excessive dropping of search space sets, especially for cases wherein search space sets may be configured with a relatively large number of BD candidates or BD candidates with large aggregation levels (ALs)—at least the latter being relatively typical in case of scheduling of traffic with low latency and/or high reliability demands like URLLC use cases.

PDCCH Overbooking for CA—Rel-15 Design Review:

The UE capability signaling for PDCCH BDs/CCEs in CA is integer value y (independent of numerology) from {4, . . . , 16}, which is used as a scaling factor to determine numbers of BDs/CCEs for CA with the number of DL-CCs aggregated, T, greater than 4 (T>4 DL-CCs). [see underlined in the table below]

The UE indicates one or more (one each for BDs and CCEs) multiplicative factor(s) of the slot-level nominal values of BDs/CCEs from Rel-15, defined on a per-numerology basis.

For up to 4 DL-CCs, the number of BDs/CCEs increase linearly. [see bolded text in the table below]

For CA cases, further detailed rules are specified as summarized in Table.1 below.

TABLE 1

PDCCH Overbooking for Carrier-Aggregation (CA) mode of operation in Rel-15

| Relationship between BD capability, y; from (4, ..., 16) as indicated by UE capability, and the number of DL-CCs aggregated, T, from (1, ..., 16). | Self-scheduling | | Cross-carrier scheduling | | Same numerology between scheduling cell and scheduled cell(s) but different numerologies between scheduling cell(s) |
|---|---|---|---|---|---|
| | Same numerology (between scheduling and scheduled CCs) | Mixed numerologies (between scheduling and scheduled CCs) | Same numerology (between scheduling and scheduled CCs) | Mixed numerologies (between scheduling and scheduled CCs) | |
| T ≤ 4 or 4 < T ≤ y | The limit per CC per slot equal to the limit for non-CA case The network ensures the number of BDs/CCEs on any SCell does not exceed the non-CA limit (e.g., Network ensures there is no overbooking in SCells) | | The limit of the scheduling CC per slot is (number of scheduled CCs)*limit for non-CA case | Not defined in Rel-15 Cross-carrier scheduling with different numerologies is postponed to Rel-16 (w/ exception of SUL) | BD/CCE limit per scheduling CC per slot is the number of CCs schedulable by the scheduling (CC) x (the limit of BDs/CCEs for non-CA case) |
| T > 4 and T > y | The total number of BDs/CCEs across CCs is based on UE BD capability. It can be split across CCs, subject to the non-CA limit on each CC For SCell, NW ensures no overbooking based on non-CA case occurs. | The total limit across CCs per μ is based on BD capability. The limit per μ is y*M(μ) and M(μ) is the proportion of the number of CCs with μ to the total number of CCs. | The total number of BDs/CCEs across CCs is based on UE BD capability. It can be split across CCs, subject to the non-CA limit on each CC. For SCell, NW ensures no overbooking based on non-CA case occurs. For cross-carrier scheduling, BDs/CCEs overlapped across DL serving cells are independently counted (e.g., counted per serving cell). | Not defined in Rel-15 Cross-carrier scheduling with different numerologies is postponed to Rel-16 (w/ exception of SUL) | BD/CCE limit per numerology per slot is Floor {Xi / (X0 + X1 + X2 + X3)* (Mi or Ni) * y)} where Xi (i = 0, 1, 2, 3) denotes the number of DL-CCs per numerology i, and Mi and Ni denote the number of BDs and CCEs per slot specified for non-CA case for numerology i, respectively |

With the new monitoring constraints/requirements defined on per monitoring span, then the overbooking and dropping rules are also impacted and should be reconsidered. For example, methods to reduce the impact from dropping of PDCCH candidates upon exceeding the BD or channel estimation minimum requirements may be used. Additionally. or alternatively, methods for prioritization and dropping based on the monitoring spans within a slot may be used, wherein it is possible that the dropping is performed at span-level or DCI-type level, instead of slot-level, and/or some candidates within a monitoring span are dropped, or dropping based on the location of the monitoring spans within a slot for the search space set, etc., mainly for non-CA mode of operation.

In addition, methods defining further details regarding the updates to BD/CCE distributions in CA cases for overbooking handling are disclosed. Additional details on dropping methods for span-based monitoring requirements are also disclosed. Unless mentioned otherwise, the examples related to PDCCH monitoring are applicable to different duplex systems, such as frequency division duplexing (FDD), time division duplexing (TDD), bandwidth parts with different numerologies, such as 15 kHz, 30 kHz, 60 kHz, 120 kHz etc., licensed and unlicensed spectrum access, etc.

Characterization of Switching Configuration Between the Two Monitoring Requirements, in Option 2:

In one embodiment, by switching between the (slot-based and span-based) configurations, the SS set configuration (provided via higher layer IE search-space-config))) may be completely or partially reconfigured (i.e., some or all of the parameters under this IE may be reconfigured). In one example, a common (sub-)set of configuration parameters (under IE SearchSpace) are predefined to be reconfigured by switching between the two configurations. In an extended example, a subset of {'controlResourceSetId', 'searchSpaceId', 'monitoringSlotPeriodicityAndOffset', 'monitoringSymbolsWithinSlot'} can be defined as the set of configuration parameters that may be assumed to persist during a monitoring configuration switch. In another extended example, a subset of {'searchSpaceType'. 'nrofCandidates', 'nrofCandidates-SFI', 'duration', 'dci-Formats', 'dci-Format2-0', 'dci-Format2-1', 'dci-Format2-2', 'dci-Format2-3', 'dci-Format0-0-AndFormat1-0', 'common', 'ue-Speciic'} can be defined as the set of configuration parameters that may be reconfigured between the two set of requirements.

In another example, additional indications are accommodated to handle one or more search space sets of common search space type, such that two sets of monitoring configurations, one applying to Rel-15 requirements and the other applying to span-based requirements. In one example, such an indication can be realized by introducing another IE carrying the additional SS set configurations. It is noted that such a design is effectively similar to configuring another SS set, where the singling is performed in a more optimized manner, with an additional set of fields applying to the span-based configurations.

In another embodiment, the search space set configuration includes an optional parameter to indicate whether the search space set applies when the UE is configured with slot-level PDCCH monitoring or span-based PDCCH monitoring.

In another embodiment, the SS set configuration is maintained the same even after switching, and only the monitoring behavior/occasions are reconfigured to the UE. To enable such a design, in one example, the number of SS sets that the UE can be configured with is increased from that used previously. As such, when the configuration is switched, the UE is configured with extra SS sets and the reconfiguration may not apply to the previously existing SS sets (the ones existed before the switching of the configurations).

Such a reconfiguration can have impacts from operational perspectives. For example, being configured according to Rel-15 or Rel-16, the UE and the gNB can make use of the monitoring capabilities in a different way (e.g., with certain SS set configuration, etc.) to address the traffic needs, blocking, resource utilization, etc. The overbooking and dropping rules may also apply differently, depending on the configuration.

Since the switching between Rel-15 and Rel-16 configurations is based on RRC signaling, there can be an ambiguity period where the UE and the gNB may be out of sync and the gNB may not be clear in terms of whether or not the UE has received and applied the new configurations. Accordingly, the connection to the UE is be maintained throughout the switching to address this ambiguity. As such, careful handling with respect to the monitoring of SS set ID #0 (search space configured by the Physical Broadcast channel (PBCH)) may be desired.

In one embodiment, the connection to the UE is preserved by maintaining the configuration of search space with SearchSpaceId=0 (the search space configured via PBCH (master information block (MIB)) or via searchSpace-SIB1, e.g., for Primary Cell (PCell), and in ServingCellConfigCommon (searchSpaceZero), e.g., for a Secondary Cell (SCell) or a PSCell in case the UE is configured with a Secondary Cell Group (SCG)) throughout the switching. Accordingly, whenever the switch happens, all SS set configurations are reset, except possibly those specified above.

In another embodiment, the monitoring occasions corresponding to one or more search space sets are preserved throughout the switching of the monitoring requirements. In one example, the monitoring occasions corresponding to one or more search space sets of type common are preserved throughout the switching of the monitoring requirements. In an extended example, the one or more search space sets of type common include the search space sets as provided to the UE via searchSpaceZero, searchSpaceSIB1, searchSpaceOtherSystemInformation, pagingSearchSpace, and ra-SearchSpace (e.g., SS ID #0 and possibly other SS sets identified for common control scheduling). In another example, in addition to the above, the one or more search space sets may also include one or more Type3-PDCCH CSS set configured by SearchSpace in PDCCH-Config with searchSpaceType=common for DCI formats with CRC scrambled by C-RNTI for the primary cell in an MCG or SCG. In an extended example, SS set configuration(s) of the one or more SS sets, indicate(s) if it/they can be assumed to persist in case of any switching between the slot-based and span-based monitoring requirements (e.g., for a Type3-CSS in the PCell or PSCell). Accordingly, a fallback mechanism can be realized during any switching between the configurations by relying on the configuration of SS #0. Particularly, the UE is expected to monitor the PDCCH candidates for the monitoring occasions associated with a SS/PBCH block, where the SS/PBCH block is determined by the most recent of:

a MAC CE activation command indicating a transmission configuration indicator (TCI) state of the active bandwidth part (BWP) that includes a CORESET with index 0, as described in [6, TS 38.214], where the TCI-state includes a CSI-RS which is quasi-co-located with the SS/PBCH block, or a random access procedure that is not initiated by a PDCCH order that triggers a non-contention based random access procedure.

In one embodiment, the monitoring occasions and PDCCH candidates corresponding to one or more search space sets of type common are configured such that they satisfy both slot- and span-level minimum requirements for PDCCH monitoring. Particularly, the span configuration accommodates PDCCH candidates corresponding to these one or more search space sets of type common, in a slot. In one example, the one or more search space sets of type common include the search space sets as provided to the UE via searchSpaceZero, searchSpaceSIB1, searchSpaceOtherSystemInformation, pagingSearchSpace, and ra-SearchSpace. In another example, in addition to the above, the one or more search space sets may also include one or more Type3-PDCCH common search space (CSS) set configured by SearchSpace in PDCCH-Config with searchSpaceType=common for DCI formats with CRC scrambled by C-RNTI for the primary cell in an master cell group (MCG) or secondary cell group (SCG).

In one embodiment, instead of configuring a new parameter as part of (each) SeachSpace to indicate whether a SS set is associated with either or both of Rel-15 and Rel-16 PDCCH monitoring configurations, a separate parameter/list in PDCCH-Config—listing the SS set indices associated with a PDCCH monitoring configuration (e.g., R15PDCCHMonitoringSearchSpaceIdList, and R16PDCCHMonitoringSearchSpaceIdList), is/are configured. In one example, a SS set can be in both lists.

In another example, if these parameters are not configured or a SS set is not listed under either configuration, then the concerned SS sets are expected to be monitored irrespective of the indication via PDCCHMonitoringCapabilityConfig (e.g., equivalent to being in both lists).

Since in Rel-15 NR specification there is no restriction on where the SS set carrying only broadcast candidates should be monitored (it can be anywhere in the slot), some consideration may be use to ensure proper behavior aligned with span-based configurations and requirements after the switching of the configuration, for example, in terms of ensuring that the monitoring occasions for SS set ID #0, satisfy the applicable span and span gap configuration, for span-based monitoring.

In one embodiment, it is specified that in such cases, when the configuration is switched to Rel-16 configurations, it is expected that all the monitoring occasions under SS set ID #0 in a slot, also fit into (belong to) the monitoring spans (e.g., monitoring occasions are aligned to the spans according to the span configuration/pattern, e.g., span duration, span gaps, boundaries, etc.).

Alternatively, some UE behavior is defined to reinterpret the monitoring occasions in case of any misalignment with respect to the span boundaries, etc. For example, the UE only monitors PDCCH candidates in the monitoring occasions that is fully contained in one span, after the configuration is switched to the span-based requirements.

Characterization of BD/CCE Distributions for Overbooking Handling in CA Cases with Enhanced Monitoring Requirements:

In CA configurations, it may be possible to consider similar principles as for cell scheduling with different numerologies. Depending on how per-span requirements coexist with per-slot requirements (as discussed above), even for a non-CA case, some scaling may be also applied. Particularly, for CA-cases, proper scaling should be also taken into account in addition to the updated dropping rules, meriting careful considerations in terms of the PDCCH monitoring enhancements.

Further, as part of the coexistence with Rel-15 requirements, possibilities to define the per-span rules in one serving cell and maintain Rel-15 (per-slot) rules in another serving cell should also be further considered, e.g., as long as the overall per-slot limits are not exceeded. In such cases, identification of how the overall dimensionality should be defined. For example, it is possible to define a mechanism to translate and measure the requirements per-slot, even if the requirements are per-span, in some serving-cell(s).

In the following, embodiments elaborating such further design aspects are described. In the following, the embodiments and examples consider that the UE is not configured for NR-DC operation. This is primarily for simplicity of presentation, and the ideas can be adapted straightforwardly to address NR-DC operation.

In Rel-15, if a UE indicates in UE-NR-Capability a carrier aggregation capability larger than 4 serving cells, the UE includes in UE-NR-Capability an indication for a maximum number of PDCCH candidates the UE can monitor per slot when the UE is configured for carrier aggregation operation over more than 4 cells. When a UE is not configured for NR-DC operation, the UE determines a capability to monitor a maximum number of PDCCH candidates per slot that corresponds to $N_{cells}^{cap}$ downlink cells, where $N_{cells}^{cap}$ is the number of configured downlink cells if the UE does not provide pdcch-BlindDetectionCA otherwise, $N_{cells}^{cap}$ is the value of pdcch-BlindDetectionCA In one embodiment of this disclosure, if a UE indicates (e.g., in UE-NR-Capability) a carrier aggregation capability larger than D serving cells (e.g., D=4) and is capable of handling both Rel-15 monitoring requirements as well as the enhanced monitoring (e.g., per-span) requirements and the UE then includes (e.g., in UE-NR-Capability) another indication for a maximum number of PDCCH candidates the UE can monitor per slot or per monitoring span according to per-span requirements, e.g., via a new UE capability parameter pdcch-BlindDetectionCA-Span, that corresponds to $N_{cells}^{cap,span}$ downlink cells.

Some options for consolidating the span- and slot-level limits are disclosed below:

Further, in another extension of the embodiment, the UE reporting pdcch-BlindDetectionCA-Span may also indicate a second value of pdcch-BlindDetectionCA, e.g., pdcch-BindDetectionCA-SlotwithSpan, to indicate the UE capability of monitoring a maximum number of PDCCH candidates the UE can monitor per slot according to slot-based PDCCH monitoring configuration, that corresponds to $N_{cells}^{cap,slot}$ downlink cells, when the UE is configured with span-based monitoring on any DL cell. If this parameter is not reported, $N_{cells}^{cap,slot}=N_{cells}^{cap}$.

In addition to the above extension or as an alternative to it, the UE reporting pdcch-BlindDetectionCA-SpanBased may also indicate using. e.g., pdcch-BlindDetectionCA-Total, the UE capability of monitoring a maximum number of PDCCH candidates the UE can monitor per slot according to both span- and slot-based PDCCH monitoring configurations, that corresponds to $N_{cells}^{cap,total}$ downlink cells, when the UE is configured with span-based monitoring on any DL cell.

In an alternative embodiment, the UE reports pdcch-BlindDetectionCA-SlotwithSpan and pdcch-BlindDetectionCA-Span as defined above, and $N_{cells}^{cap,total}=N_{cells}^{cap,slot}+N_{spans,\ max}*N_{cells}^{cap,\ span}$, where $N_{spans,\ max}$ is the maximum number of spans across all span-and-span-gap configurations supported by the UE.

Note: In the following, $N_{cells}^{cap2}=N_{cells}^{cap,span}$.

Note: in the following, Rel-15 and Rel-16 enhanced PDCCH monitoring are equivalent to the slot-based and span-based monitoring, respectively, implying that the minimum requirements on the number of BDs and/or non-overlapping CCEs are defined on slot- or span-bases.

In another embodiment, if a UE is configured with $N_{cells}^{DL,\mu}$ downlink cells with DL BWPs having SCS configuration μ (μ=0, 1, 2, 3) where $$\sum_{\mu=0}^{3} N_{cells}^{DL,\mu} \leq N_{cells}^{cap} + N_{cells}^{cap2}$$

(alternatively, where, $\Sigma_{\mu=0}^{3} N_{cells}^{DL,\mu} \leq N_{cells}^{cap,total}$), the UE may (or may not) monitor, on the active DL BWP of the scheduling cell, more than $$M_{PDCCH}^{total,slot,\mu} = \left[ M_{PDCCH}^{max,slot,\mu} \times \frac{N_{cells}^{cap}}{N_{cells}^{cap} + N_{cells}^{cap2}} + M_{PDCCH}^{max,s,\mu} \times \frac{N_{cells}^{cap2}}{N_{cells}^{cap} + N_{cells}^{cap2}} \right] \times N_{cells}^{cap,total}$$

(e.g., weighted sum of the maximum number of monitored PDCCH candidates per slot and the maximum number of monitored PDCCH candidates in a slot, determined based on the per-span requirements, per serving cell for a DL BWP with SCS configuration μ, as defined for non-CA case, scaled by $N_{cells}^{cap,total}$) PDCCH candidates or more than $$C_{PDCCH}^{total,slot,\mu} = \left[ C_{PDCCH}^{max,slot,\mu} \times \frac{N_{cells}^{cap}}{N_{cells}^{cap} + N_{cells}^{cap2}} + C_{PDCCH}^{max,s,\mu} \times \frac{N_{cells}^{cap2}}{N_{cells}^{cap} + N_{cells}^{cap2}} \right] \times N_{cells}^{cap,total}$$

(weighted sum of the maximum number of non-overlapped CCEs per slot and the maximum number of non-overlapped CCEs in a slot, determined based on the per-span requirements, per serving cell for a DL BWP with SCS configuration P, as defined for non-CA case, scaled by $N_{cells}^{cap,total}$) non-overlapped CCEs per slot for each scheduled cell.

Alternatively, if a UE is configured with $N_{cells}^{DL,\mu}$ downlink cells with DL BWPs having SCS configuration μ (μ=0, 1, 2, 3) where $$\sum_{\mu=0}^{3} N_{cells}^{DL,\mu} \leq N_{cells}^{cap} + N_{cells}^{cap2}$$

(alternatively, where, $\Sigma_{\mu=0}^{3} N_{cells}^{DL,\mu} \leq N_{cells}^{cap,total}$), the UE may (or may not) monitor, on the active DL BWP of the scheduling cell, more than $M_{PDCCH}^{total,slot,\mu} = M_{PDCCH}^{max,slot,\mu} \times N_{cells}^{cap} + M_{PDCCH}^{max,s,\mu} \times N_{cells}^{cap2}$ PDCCH candidates or more than $C_{PDCCH}^{total,slot,\mu} = C_{PDCCH}^{max,slot,\mu} \times N_{cells}^{cap} + C_{PDCCH}^{max,s,\mu} \times N_{cells}^{cap2}$ non-overlapped CCEs per slot for each scheduled cell.

In another embodiment, if a UE is configured with $N_{cells}^{DL,\mu}$ downlink cells with DL BWPs having SCS configuration μ (μ=0, 1, 2, 3) where the number of DL scheduling cells with slot-based (Rel-15) PDCCH monitoring does not exceed $N_{cells}^{cap}$ and the number of DL scheduling cells configured with span-based (Rel-16)(enhanced) PDCCH monitoring does not exceed $N_{cells}^{cap2}$, the UE may (or may not) monitor, on the active DL BWP of the scheduling cell, more than $$M_{PDCCH}^{total,slot,\mu} = \left[ M_{PDCCH}^{max,slot,\mu} \times \frac{N_{cells}^{cap}}{N_{cells}^{cap} + N_{cells}^{cap2}} + M_{PDCCH}^{max,s,\mu} \times \frac{N_{cells}^{cap2}}{N_{cells}^{cap} + N_{cells}^{cap2}} \right]$$

(weighted sum of the maximum number of monitored PDCCH candidates per slot and the maximum number of monitored PDCCH candidates in a slot, determined based on the per-span requirements, per serving cell for a DL BWP with SCS configuration μ, as defined for non-CA case, scaled by $N_{cells}^{cap,total}$) PDCCH candidates or more than $$C_{PDCCH}^{total,slot,\mu} = \left[ C_{PDCCH}^{max,slot,\mu} \times \frac{N_{cells}^{cap}}{N_{cells}^{cap} + N_{cells}^{cap2}} + C_{PDCCH}^{max,s,\mu} \times \frac{N_{cells}^{cap2}}{N_{cells}^{cap} + N_{cells}^{cap2}} \right]$$

(weighted sum of the maximum number of non-overlapped CCEs per slot and the maximum number of non-overlapped CCEs in a slot, determined based on the per-span requirements, per serving cell for a DL BWP with SCS configuration μ, as defined for non-CA case, scaled by $N_{cells}^{cap,total}$) non-overlapped CCEs per slot for each scheduled cell.

Alternatively, if a UE is configured with $N_{cells}^{DL,\mu}$ downlink cells with DL BWPs having SCS configuration μ (μ=0, 1, 2, 3) where the number of DL scheduling cells configured with slot-based (Rel-15) PDCCH monitoring does not exceed $N_{cells}^{cap}$ and the number of DL scheduling cells configured with span-based (Rel-16)(enhanced) PDCCH monitoring does not exceed $N_{cells}^{cap2}$, the UE may (or may not) monitor, on the active DL BWP of the scheduling cell, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell, if DL scheduling cell is not configured with enhanced PDCCH monitoring. Further, the UE may or may not monitor, on the active DL BWP of the scheduling cell, more than $M_{PDCCH}^{total,slot,\mu} = M_{PDCCH}^{max,s,\mu}$ PDCCH candidates or more than $C_{PDCCH}^{total,slot,\mu} = C_{PDCCH}^{max,s,\mu}$ non-overlapped CCEs per slot for each scheduled cell, if DL scheduling cell is configured with enhanced PDCCH monitoring.

In one example, determination of the maximum number of non-overlapped CCEs in a slot based on the per-span requirements is performed via scaling of the per-span requirement by the total number of spans in a slot.

In another example, the maximum number of monitored PDCCH candidates in a slot, determined based on the per-span requirements, per serving cell for a DL BWP with SCS configuration μ, $M_{PDCCH}^{max,s,\mu}$, can be greater than or equal to $M_{PDCCH}^{max,slot,\mu}$, meaning that the requirements on the number of BDs for enhanced monitoring requirements can also be the same as per-slot requirements. In an example, $M_{PDCCH}^{max,s,\mu} = \max(M_{PDCCH}^{max,span,\mu} \times N_{spans})$, where $M_{PDCCH}^{max,span,\mu}$ and $N_{spans}$ are the span-level max limit on number of BDs and number of spans for a particular span configuration, and the maximum operation is defined over all span-configurations reported as being supported by the UE.

Note that $M_{PDCCH}^{max,s,\mu} = M_{PDCCH}^{max,slot,\mu}$ if span-level limits are not defined for requirements on number of BDs.

In yet another example, the maximum number of non-overlapped CCEs in a slot, determined based on the per-span requirements, per serving cell for a DL BWP with SCS configuration μ, $C_{PDCCH}^{max,s,\mu}$, can be greater than or equal to $C_{PDCCH}^{max,slot,\mu}$. In an example, $C_{PDCCH}^{max,s,\mu} = \max(C_{PDCCH}^{max,span,\mu} \times N_{spans})$, where $C_{PDCCH}^{max,span,\mu}$ and $N_{spans}$ are the span-level max limit on number of non-overlapped CCEs and number of spans for a particular span configuration, and the maximum operation is defined over all span-configurations reported as being supported by the UE.

In one embodiment, if a UE is configured with $N_{cells}^{DL,\mu}$ downlink cells with DL BWPs having SCS configuration $\mu$, where $$\sum_{\mu=0}^{3} N_{cells}^{DL,\mu} > N_{cells}^{cap} + N_{cells}^{cap2}$$

(alternatively, where, $\Sigma_{\mu=0}^{3} N_{cells}^{DL,\mu} > N_{cells}^{cap,total}$), a DL BWP of an activated cell is the active DL BWP of the activated cell, and a DL BWP of a deactivated cell is the DL BWP with index provided by firstActiveDownlinkBWP-Id for the deactivated cell, the UE may or may not monitor more than $$M_{PDCCH}^{total,slot,\mu} = \left\lfloor \left( M_{PDCCH}^{max,slot,\mu} \times \frac{N_{cells}^{cap}}{N_{cells}^{cap} + N_{cells}^{cap2}} + M_{PDCCH}^{max,s,\mu} \times \frac{N_{cells}^{cap2}}{N_{cells}^{cap} + N_{cells}^{cap2}} \right) \times \right.$$

$$\left. N_{cells}^{cap,total} \times \frac{N_{cells}^{DL,\mu}}{\sum_{j=0}^{D-1} N_{cells}^{DL,j}} \right\rfloor$$

candidates or more than $$C_{PDCCH}^{total,slot,\mu} = \left\lfloor \left( C_{PDCCH}^{max,slot,\mu} \times \frac{N_{cells}^{cap}}{N_{cells}^{cap} + N_{cells}^{cap2}} + C_{PDCCH}^{max,s,\mu} \times \frac{N_{cells}^{cap2}}{N_{cells}^{cap} + N_{cells}^{cap2}} \right) \times \right.$$

$$\left. N_{cells}^{cap,total} \times \frac{N_{cells}^{DL,\mu}}{\sum_{j=0}^{D-1} N_{cells}^{DL,j}} \right\rfloor$$

non-overlapped CCEs, per numerology, per slot on the active DL BWP(s) of scheduling cell(s) from the $N_{cells}^{DL,\mu}$ downlink cells.

Alternatively, if a UE is configured with $N_{cells}^{DL,\mu}$ downlink cells with DL BWPs having SCS configuration $\mu$, where $$\sum_{\mu=0}^{3} N_{cells}^{DL,\mu} > N_{cells}^{cap} + N_{cells}^{cap2}$$

(alternatively, where, $\Sigma_{\mu=0}^{3} N_{cells}^{DL,\mu} > N_{cells}^{cap,total}$), a DL BWP of an activated cell is the active DL BWP of the activated cell, and a DL BWP of a deactivated cell is the DL BWP with index provided by firstActiveDownlinkBWP-Id for the deactivated cell, the UE may (or may not) monitor more than $$M_{PDCCH}^{total,slot,\mu} =$$

$$\left\lfloor (M_{PDCCH}^{max,slot,\mu} \times N_{cells}^{cap} + M_{PDCCH}^{max,s,\mu} \times N_{cells}^{cap2}) \times \frac{N_{cells}^{DL,\mu}}{\sum_{j=0}^{D-1} N_{cells}^{DL,j}} \right\rfloor \text{ PDCCH}$$

candidates or more than $$C_{PDCCH}^{total,slot,\mu} = \left\lfloor \left( C_{PDCCH}^{max,slot,\mu} \times \frac{N_{cells}^{cap}}{N_{cells}^{cap} + N_{cells}^{cap2}} + C_{PDCCH}^{max,s,\mu} \times \frac{N_{cells}^{cap2}}{N_{cells}^{cap} + N_{cells}^{cap2}} \right) \times \frac{N_{cells}^{cap2DL,\mu}}{\sum_{j=0}^{D-1} N_{cells}^{DL,j}} \right\rfloor$$

non-overlapped CCEs, per numerology, per slot on the active DL BWP(s) of scheduling cell(s) from the $N_{cells}^{DL,\mu}$ downlink cells.

In another embodiment, if a UE is configured with $N_{cells}^{DL,\mu}$ downlink cells with DL BWPs having SCS configuration $\mu$, where the number of DL scheduling cells configured with slot-based (Rel-15) PDCCH monitoring exceeds $N_{cells}^{cap}$ or the number of DL scheduling cells configured with span-based (Rel-16)(enhanced) PDCCH monitoring exceeds $N_{cells}^{cap2}$, a DL BWP of an activated cell is the active DL BWP of the activated cell, and a DL BWP of a deactivated cell is the DL BWP with index provided by firstActiveDownlinkBWP-Id for the deactivated cell, the UE may (or may not) monitor more than $$M_{PDCCH}^{total,slot,\mu} =$$

$$\left\lfloor \left( M_{PDCCH}^{max,slot,\mu} \times \frac{N_{cells}^{cap}}{N_{cells}^{cap} + N_{cells}^{cap2}} + M_{PDCCH}^{max,s,\mu} \times \frac{N_{cells}^{cap2}}{N_{cells}^{cap} + N_{cells}^{cap2}} \right) \times N_{cells}^{cap,total} \times \right.$$

$$\left. \frac{N_{cells}^{DL,\mu}}{\sum_{j=0}^{D-1} N_{cells}^{DL,\mu}} \right\rfloor \text{ PDCCH}$$

candidates or more than $$C_{PDCCH}^{total,slot,\mu} = \left\lfloor \left( C_{PDCCH}^{max,slot,\mu} \times \frac{N_{cells}^{cap}}{N_{cells}^{cap} + N_{cells}^{cap2}} + C_{PDCCH}^{max,s,\mu} \times \frac{N_{cells}^{cap2}}{N_{cells}^{cap} + N_{cells}^{cap2}} \right) \times \right.$$

$$\left. N_{cells}^{cap,total} \times \frac{N_{cells}^{DL,\mu}}{\sum_{\mu=0}^{3} N_{cells}^{DL,\mu}} \right\rfloor$$

non-overlapped CCEs, per numerology, per slot on the active DL BWP(s) of scheduling cell(s) from the $N_{cells}^{DL,\mu}$ downlink cells. (note: the summation in the denominators is across all DL serving cells across numerology).

Alternatively, if a UE is configured with $N_{cells}^{DL,\mu}$ downlink cells with DL BWPs having SCS configuration $\mu$, the number of DL scheduling cells configured with slot-based (Rel-15) PDCCH monitoring exceeds $N_{cells}^{cap}$ or the number of DL scheduling cells configured with span-based (Rel-16)(enhanced) PDCCH monitoring exceeds $N_{cells}^{cap2}$, a DL BWP of an activated cell is the active DL BWP of the activated cell, and a DL BWP of a deactivated cell is the DL BWP with index provided by firstActiveDownlinkBWP-Id for the deactivated cell, the UE (may or may not) to monitor more than $$M_{PDCCH}^{total,slot,\mu} = \left\lceil (M_{PDCCH}^{max,slot,\mu} \times N_{cells}^{cap} + M_{PDCCH}^{max,s,\mu} \times N_{cells}^{cap2}) \times \frac{N_{cells}^{DL,\mu}}{\sum_{\mu=0}^{3} N_{cells}^{DL,\mu}} \right\rceil PDCCH$$

candidates or more than $$C_{PDCCH}^{total,slot,\mu} =$$

$$\left\lceil \left( C_{PDCCH}^{max,slot,\mu} \times \frac{N_{cells}^{cap}}{N_{cells}^{cap} + N_{cells}^{cap2}} + C_{PDCCH}^{max,s,\mu} \times \frac{N_{cells}^{cap2}}{N_{cells}^{cap} + N_{cells}^{cap2}} \right) \times \frac{N_{cells}^{cap2DL,\mu}}{\sum_{\mu=0}^{3} N_{cells}^{DL,\mu}} \right\rceil$$

non-overlapped CCEs, per numerology, per slot on the active DL BWP(s) of scheduling cell(s) from the $N_{cells}^{DL,\mu}$ downlink cells.

As another alternative, if a UE is configured with $N_{cells}^{DL,\mu}$ downlink cells with DL BWPs having SCS configuration μ, the number of DL scheduling cells configured with slot-based (Rel-15) PDCCH monitoring exceeds $N_{cells}^{cap}$ or the number of DL scheduling cells configured with span-based (Rel-16)(enhanced) PDCCH monitoring exceeds $N_{cells}^{cap2}$, a DL BWP of an activated cell is the active DL BWP of the activated cell, and a DL BWP of a deactivated cell is the DL BWP with index provided by firstActiveDownlinkBWP-Id for the deactivated cell, the UE may or may not monitor more than $$M_{PDCCH}^{total,slot,\mu} = \left\lceil (M_{PDCCH}^{max,slot,\mu} \times N_{cells}^{cap} + M_{PDCCH}^{max,s,\mu} \times N_{cells}^{cap2}) \times \frac{N_{cells}^{DL,\mu}}{\sum_{\mu=0}^{3} N_{cells}^{DL,\mu}} \right\rceil PDCCH$$

candidates or more than $$C_{PDCCH}^{total,slot,\mu} = \left\lceil (C_{PDCCH}^{max,slot,\mu} \times N_{cells}^{cap} + C_{PDCCH}^{max,s,\mu} \times N_{cells}^{cap2}) \times \frac{N_{cells}^{DL,\mu}}{\sum_{\mu=0}^{3} N_{cells}^{DL,\mu}} \right\rceil$$

non-overlapped CCEs, per numerology, per slot on the active DL BWP(s) of scheduling cell(s) from the $N_{cells}^{DL,\mu}$ downlink cells.

In 3GPP TS 38.213, Clause 10, it has been specified that if the UE is provided PDCCHMonitoringCapabilityConfig=R16 PDCCH monitoring capability for all downlink cell where the UE monitors PDCCH, the UE determines a capability to monitor a maximum number of PDCCH candidates and a maximum number of non-overlapped CCEs per span that corresponds to $N_{cells}^{cap-r16}$ downlink cells, where $N_{cells}^{cap-r16}$ is the number of configured downlink cells if the UE does not provide pdcch-BlindDetectionCA-r16 otherwise, $N_{cells}^{cap-r16}$ is the value of pdcch-BindDetectionCA-r16

Further, if the UE is capable of handling both Rel-15 monitoring requirements as well as the enhanced monitoring (e.g., per-span) requirements, the UE determines a capability to monitor a maximum number of PDCCH candidates and a maximum number of non-overlapped CCEs per slot or per span that corresponds to $N_{cells,r15}^{cap-r16}$ downlink cells or to $N_{cells,r16}^{cap-r16}$ downlink cells, respectively, where $N_{cells,r15}^{cap-r16}$ is the number of configured downlink cells if the UE does not provide pdcch-BlindDetectionCA-r15 otherwise, $N_{cells,r15}^{cap-r16}$ is the value of pdcch-BlindDetectionCA-r15 and $N_{cells,r16}^{cap-r16}$ is the number of configured downlink cells if the UE does not provide pdcch-BlindDetectionCA-r16 otherwise, $N_{cells,r16}^{cap-r16}$ is the value of pdcch-BlindDetectionCA-r16.

Considering the above notation, and as another alternative to the previous embodiment, if a UE is configured with $N_{cells}^{DL,\mu}$ downlink cells with DL BWPs having SCS configuration μ, where the number of DL scheduling cells configured with slot-based (Rel-15) PDCCH monitoring exceeds $N_{cells,r15}^{cap-r16}$ or the number of DL scheduling cells configured with span-based (Rel-16) PDCCH monitoring exceeds $N_{cells,r16}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE may (or may not) to monitor more than $$M_{PDCCH}^{total,slot,\mu} =$$

$$\left\lceil (M_{PDCCH}^{max,slot,\mu} \times N_{cells,r15}^{cap-r16} + M_{PDCCH}^{max,s,\mu} \times N_{cells,r16}^{cap-r16}) \times \frac{N_{cells}^{DL,\mu}}{\sum_{\mu=0}^{3} N_{cells}^{DL,\mu}} \right\rceil PDCCH$$

candidates or more than $$C_{PDCCH}^{total,slot,\mu} = \left\lceil (C_{PDCCH}^{max,slot,\mu} \times N_{cells,r15}^{cap-r16} + C_{PDCCH}^{max,s,\mu} \times N_{cells,r16}^{cap-r16}) \times \frac{N_{cells}^{DL,\mu}}{\sum_{\mu=0}^{3} N_{cells}^{DL,\mu}} \right\rceil$$

non-overlapped CCEs, per numerology, per slot on the active DL BWP(s) of scheduling cell(s) from the $N_{cells}^{DL,\mu}$ downlink cells.

When determining the capability distribution across the cells for CA operation, in the next embodiments, the PDCCH monitoring capabilities for Rel-15 and Rel-16 monitoring configurations are assumed to be dimensioned separately. This follows a capability reporting framework that identifies slot-level and span-level monitoring configurations and their related processing capabilities separately.

Accordingly, in one embodiment, if a UE is configured with $N_{cells,r15}^{DL,\mu,r16}$ and $N_{cells,r16}^{DL,\mu,r16}$ downlink cells with DL BWPs having SCS configuration μ (μ=0, 1, 2, 3), corresponding to Rel-15 and Rel-16 PDCCH monitoring configurations respectively, where the number of DL scheduling cells configured with slot-based (Rel-15) PDCCH monitoring does not exceed $N_{cells,r15}^{cap-r16}$, the UE may or may not monitor, on the active DL BWP of the scheduling cell, more than $M_{PDCCH,r15}^{total,slot,\mu,r16}=M_{PDCCH}^{max,slot,\mu}$ PDCCH candidates or more than $C_{PDCCH,r15}^{total,slot,\mu,r16}=C_{PDCCH}^{max,slot,\mu}$ non-overlapped CCEs per slot for each scheduled cell, if DL scheduling cell is not configured with enhanced PDCCH monitoring.

Further, if a UE is configured with $N_{cells,r15}^{DL,\mu,r16}$ and $N_{cells,r16}^{DL,\mu,r16}$ downlink cells with DL BWPs having SCS configuration $\mu$ ($\mu$=0, 1, 2, 3), corresponding to Rel-15 and Rel-16 PDCCH monitoring configurations respectively, where the number of DL scheduling cells configured with span-based (Rel-16)(enhanced) PDCCH monitoring does not exceed $N_{cells,r16}^{cap-r16}$, the UE may (or may not) monitor, on the active DL BWP of the scheduling cell, more than $M_{PDCCH,r16}^{total,slot,\mu,r16} = M_{PDCCH}^{max,s,\mu}$ PDCCH candidates (where $M_{PDCCH}^{max,s,\mu} = \max(M_{PDCCH}^{max,span(X,Y),\mu} \times N_{spans})$), or more than $C_{PDCCH,r16}^{total,slot,\mu,r16} = C_{PDCCH}^{max,s,\mu}$ non-overlapped CCEs (where $C_{PDCCH}^{max,s,\mu} = \max(C_{PDCCH}^{max,span(X,Y),\mu} \times N_{spans})$), per slot for each scheduled cell, if DL scheduling cell is configured with enhanced PDCCH monitoring, where $C_{PDCCH}^{max,span(X,Y),\mu}$ and $M_{PDCCH}^{max,span(X,Y),\mu}$ are the maximum number of non-overlapped CCEs, and the maximum number of monitored PDCCH candidates, per span per cell for a given span configuration (X, Y) with SCS configuration $\mu$, respectively, and $N_{spans}$ is the number of spans for a particular span configuration, and the maximum operation is defined over all span-configurations reported as being supported by the UE.

In another embodiment, if a UE is configured with $N_{cells,r15}^{DL,\mu,r16}$ and $N_{cells,r16}^{DL,\mu,r16}$ downlink cells with DL BWPs having SCS configuration $\mu$ ($\mu$=0, 1, 2, 3), corresponding to Rel-15 and Rel-16 PDCCH monitoring configurations respectively, where the number of DL scheduling cells configured with slot-based (Rel-15) PDCCH monitoring exceeds $N_{cells,r15}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE may (or may not) monitor more than $$M_{PDCCH,r15}^{total,slot,\mu,r16} = \left\lfloor (M_{PDCCH}^{max,slot,\mu} \times N_{cells,r15}^{cap-r16}) \times \frac{N_{cells,r15}^{DL,\mu,r16}}{\sum_{\mu=0}^{3} N_{cells,r15}^{DL,\mu,r16}} \right\rfloor PDCCH$$

candidates or more than $$C_{PDCCH,r15}^{total,slot,\mu,r16} = \left\lfloor (C_{PDCCH}^{max,slot,\mu} \times N_{cells,r15}^{cap-r16}) \times \frac{N_{cells,r15}^{DL,\mu,r16}}{\sum_{\mu=0}^{3} N_{cells,r15}^{DL,\mu,r16}} \right\rfloor$$

non-overlapped CCEs, per numerology, per slot on the active DL BWP(s) of scheduling cell(s) from the $N_{cells,r15}^{DL,\mu,r16}$ downlink cells.

Further, if a UE is configured with $N_{cells,r15}^{DL,\mu,r16}$ and $N_{cells,r16}^{DL,\mu,r16}$ downlink cells with DL BWPs having SCS configuration $\mu$ ($\mu$=0, 1, 2, 3), corresponding to Rel-15 and Rel-16 PDCCH monitoring configurations, respectively, where the number of DL scheduling cells configured with span-based (Rel-16) PDCCH monitoring exceeds $N_{cells,r16}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE may (or may not) monitor more than $$M_{PDCCH,r16}^{total,slot,\mu,r16} = \left\lfloor (M_{PDCCH}^{max,s,\mu} \times N_{cells,r16}^{cap-r16}) \times \frac{N_{cells,r16}^{DL,\mu,r16}}{\sum_{\mu=0}^{3} N_{cells,r16}^{DL,\mu,r16}} \right\rfloor PDCCH$$

candidates or more than $$C_{PDCCH,r16}^{total,slot,\mu,r16} = \left\lfloor (C_{PDCCH}^{max,s,\mu} \times N_{cells,r16}^{cap-r16}) \times \frac{N_{cells,r16}^{DL,\mu,r16}}{\sum_{\mu=0}^{3} N_{cells,r16}^{DL,\mu,r16}} \right\rfloor$$

non-overlapped CCEs, per numerology, per slot on the active DL BWP(s) of scheduling cell(s) from the $N_{cells,r16}^{DL,\mu,r16}$ downlink cells.

In an extended embodiment, if a UE is configured with $N_{cells,r15}^{DL,\mu,r16}$ and $N_{cells,r16}^{DL,\mu,r16}$ downlink cells with DL BWPs having SCS configuration $\mu$ ($\mu$=0, 1, 2, 3), corresponding to Rel-15 and Rel-16 PDCCH monitoring configurations, respectively, the UE may or may not monitor on the active DL BWP with SCS configuration $\mu$ of the scheduling cell configured with Rel-16 PDCCH monitoring configuration, more than $M_{max,r16}^{span,r16} = \min(M_{PDCCH}^{max,span(X,Y),\mu} \times N_{cells,r16}^{cap-r16}, \lfloor M_{PDCCH,r16}^{total,slot,\mu,r16}/N_{spans} \rfloor)$ PDCCH candidates or more than $C_{max,r16}^{span,r16} = \min(C_{PDCCH}^{max,span(X,Y),\mu} \times N_{cells,r16}^{cap-r16}, \lfloor C_{PDCCH,r16}^{total,slot,\mu,r16}/N_{spans} \rfloor)$ non-overlapped CCEs per span, where $C_{PDCCH}^{max,span(X,Y),\mu}$, and $M_{PDCCH}^{max,span(X,Y),\mu}$ the maximum number of non-overlapped CCEs, and the maximum number of monitored PDCCH candidates, per span per cell for a given span configuration (X, Y) with SCS configuration $\mu$, respectively.

In another variant of the above extended embodiment, if a UE is configured with $N_{cells,r15}^{DL,\mu,r16}$ and $N_{cells,r16}^{DL,\mu,r16}$ downlink cells with DL BWPs having SCS configuration $\mu$ ($\mu$=0, 1, 2, 3), corresponding to Rel-15 and Rel-16 PDCCH monitoring configurations, respectively, the UE may or may not monitor on the active DL BWP with SCS configuration $\mu$ of the scheduling cell configured with Rel-16 PDCCH monitoring configuration, more than $M_{max,r16}^{span,r16} = \max(\min(M_{PDCCH}^{max,span(X,Y),\mu} \times N_{cells,r16}^{cap-r16}, \lfloor M_{PDCCH,r16}^{total,slot,\mu,r16}/N_{spans} \rfloor))$ PDCCH candidates or more than $C_{max,r16}^{span,r16} = \max(\min(C_{PDCCH}^{max,span(X,Y),\mu} \times N_{cells,r16}^{cap-r16}, \lfloor C_{PDCCH,r16}^{total,slot,\mu,r16}/N_{spans} \rfloor))$ non-overlapped CCEs per span, where $C_{PDCCH}^{max,span(X,Y),\mu}$ and $M_{PDCCH}^{max,span(X,Y),\mu}$ are the maximum number of non-overlapped CCEs, and the maximum number of monitored PDCCH candidates, per span per cell for a given span configuration (X, Y) with SCS configuration $\mu$, respectively. Further, the maximum operation is defined over all span-configurations/patterns reported as being supported by the UE across different cells (scheduling and scheduled cells) configured with R16 monitoring.

In one embodiment, if a UE is only configured with $N_{cells,r16}^{DL,\mu}$ downlink cells with DL BWPs having SCS configuration $\mu$ ($\mu$=0, 1, 2, 3), corresponding to Rel-16 PDCCH monitoring configurations, where the number of DL scheduling cells configured with span-based (Rel-16) (enhanced) PDCCH monitoring does not exceed $N_{cells}^{cap-r16}$, the UE may or may not monitor, on the active DL BWP of the scheduling cell, more than $M_{PDCCH,r16}^{total,slot,\mu} = M_{PDCCH}^{max,s,\mu}$ PDCCH candidates (where $M_{PDCCH}^{max,s,\mu} = \max(M_{PDCCH}^{max,span(X,Y),\mu} \times N_{spans})$) or more than $C_{PDCCH,r16}^{total,slot,\mu} = C_{PDCCH}^{max,s,\mu}$ non-overlapped CCEs (where $C_{PDCCH}^{max,s,\mu} = \max(C_{PDCCH}^{max,span(X,Y),\mu} \times N_{spans})$) per slot for each scheduled cell, if DL scheduling cell is configured with enhanced PDCCH monitoring, where $C_{PDCCH}^{max,span(X,Y),\mu}$ and $M_{PDCCH}^{max,span(X,Y),\mu}$ are the maximum number of non-overlapped CCEs, and the maximum number of monitored PDCCH candidates, per span per cell for a given span configuration (X, Y) with SCS configuration µ, respectively, and $N_{spans}$ is the number of spans for a particular span configuration, and the maximum operation is defined over all span-configurations reported as being supported by the UE.

In another embodiment, if a UE is only configured with $N_{cells,r16}^{DL,\mu}$ downlink cells with DL BWPs having SCS configuration µ (µ=0, 1, 2, 3), corresponding to Rel-16 PDCCH monitoring configurations, where the number of DL scheduling cells configured with span-based (Rel-16) PDCCH monitoring exceeds $N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE may or may not monitor more than $$M_{PDCCH,r16}^{total,slot,\mu} = \left\lfloor (M_{PDCCH}^{max,s,\mu} \times N_{cells}^{cap-r16}) \times \frac{N_{cells,r16}^{DL,\mu}}{\sum_{\mu=0}^{3} N_{cells,r16}^{DL,\mu}} \right\rfloor PDCCH$$

candidates or more than $$C_{PDCCH,r16}^{total,slot,\mu} = \left\lfloor (C_{PDCCH}^{max,s,\mu} \times N_{cells}^{cap-r16}) \times \frac{N_{cells,r16}^{DL,\mu}}{\sum_{\mu=0}^{3} N_{cells,r16}^{DL,\mu}} \right\rfloor$$

non-overlapped CCEs, per numerology, per slot on the active DL BWP(s) of scheduling cell(s) from the $N_{cells,r16}^{DL,\mu}$ downlink cells.

In an extended embodiment, if a UE is only configured with $N_{cells,r16}^{DL,\mu}$ downlink cells with DL BWPs having SCS configuration µ (µ=0, 1, 2, 3), corresponding to Rel-16 PDCCH monitoring configurations, the UE may or may not monitor on the active DL BWP with SCS configuration µ of the scheduling cell configured with Rel-16 PDCCH monitoring configuration, more than $M_{max,r16}^{span}$=min $(M_{PDCCH}^{max,span(X,Y),\mu} \times N_{cells}^{cap-r16}, \lfloor M_{PDCCH}^{total,slot,\mu} \times f_{cells}^{span(X,Y),\mu}/N_{spans}\rfloor)$ PDCCH candidates or more than $C_{max,r16}^{span}$=min $(C_{PDCCH}^{max,span(X,Y),\mu} \times N_{cells}^{cap-r16}, \lfloor C_{PDCCH,r16}^{total,slot,\mu} \times f_{cells}^{span(X,Y),\mu}/N_{spans}\rfloor)$ non-overlapped CCEs per span, where $C_{PDCCH}^{max,span(X,Y),\mu}$, and $M_{PDCCH}^{max,span(X,Y),\mu}$ the maximum number of non-overlapped CCEs, and the maximum number of monitored PDCCH candidates, per span per cell for a given span configuration (X, Y) with SCS configuration µ, respectively, and $f_{cells}^{span(X,Y),\mu}$ the ratio of the number of DL cells, with DL BWPs having SCS configuration µ, for which span pattern (X,Y) applies (resulting from the configured search space sets for the serving cells) to the number of DL cells, with DL BWPs having SCS configuration µ, configured with Rel-16 PDCCH monitoring.

In another variant of the above extended embodiment, if a UE is only configured with $N_{cells,r16}^{DL,\mu}$ downlink cells with DL BWPs having SCS configuration µ (µ=0, 1, 2, 3),corresponding to Rel-16 PDCCH monitoring configurations, the UE may or may not monitor on the active DL BWP with SCS configuration µ of the scheduling cell configured with Rel-16 PDCCH monitoring configuration, more than $M_{max,r16}^{span}$=max(min $(M_{PDCCH}^{max,span(X,Y),\mu} \times N_{cells}^{cap-r16}, \lfloor M_{PDCCH,r16}^{total,slot,\mu}/N_{spans}\rfloor))$ PDCCH candidates or more than $C_{max,r16}^{span}$=max(min $(C_{PDCCH}^{max,span(X,Y),\mu} \times N_{cells}^{cap-r16}, \lfloor C_{PDCCH,r16}^{total,slot,\mu}/N_{spans}\rfloor))$ non-overlapped CCEs per span, where $C_{PDCCH}^{max,span(X,Y),\mu}$ and $M_{PDCCH}^{max,span(X,Y),\mu}$ are the maximum number of non-overlapped CCEs, and the maximum number of monitored PDCCH candidates, per span per cell for a given span configuration (X, Y) with SCS configuration µ, respectively. Further, the maximum operation is defined over all span-configurations/patterns reported as being supported by the UE across different cells (scheduling and scheduled cells) configured with R16 monitoring.

In another embodiment, for each scheduled cell, the UE may or may not monitor on the active DL BWP with SCS configuration µ of the scheduling cell more than $$M_{max}^{slot,\mu} = \min\left( M_{PDCCH}^{max,slot,\mu} \times \frac{N_{cells}^{cap}}{N_{cells}^{cap} + N_{cells}^{cap2}}, \right.$$

$$\left. M_{PDCCH}^{max,s,\mu} \times \frac{N_{cells}^{cap2}}{N_{cells}^{cap} + N_{cells}^{cap2}}, M_{PDCCH}^{total,slot,\mu} \right) PDCCH$$

candidates or more than $$C_{max}^{slot,\mu} =$$

$$\min\left( C_{PDCCH}^{max,slot,\mu} \times \frac{N_{cells}^{cap}}{N_{cells}^{cap} + N_{cells}^{cap2}}, C_{PDCCH}^{max,s,\mu} \times \frac{N_{cells}^{cap2}}{N_{cells}^{cap} + N_{cells}^{cap2}}, C_{PDCCH}^{total,slot,\mu} \right)$$

non-overlapped CCEs per slot. Further, the UE may or may not monitor on the active DL BWP with SCS configuration µ of the scheduling cell more than $M_{max}^{span}$=Floor(min $(M_{PDCCH}^{max,span,\mu} \times N_{cells}^{cap2}, M_{max}^{slot,\mu}/N_{spans}))$ PDCCH candidates or more than $C_{max}^{span}$=Floor(min $(C_{PDCCH}^{max,span,\mu} \times N_{cells}^{cap2}, C_{max}^{slot,\mu}/N_{spans}))$ non-overlapped CCEs per span for a DL scheduling cell with span-based monitoring.

In another variant of the above embodiment, for each scheduled cell, the UE may or may not monitor on the active DL BWP with SCS configuration µ of the scheduling cell more than $M_{max}^{slot,\mu}$=min$(M_{PDCCH}^{max,slot,\mu}, M_{PDCCH}^{max,s,\mu}, M_{PDCCH}^{total,slot,\mu})$ PDCCH candidates or more than $C_{max}^{slot,\mu}$=min$(C_{PDCCH}^{max,slot,\mu}, C_{PDCCH}^{max,s,\mu}, C_{PDCCH}^{total,slot,\mu})$ non-overlapped CCEs per slot. Further, the UE may or may not monitor on the active DL BWP with SCS configuration µ of the scheduling cell more than $M_{max}^{span}$=Floor(min$(M_{PDCCH}^{max,span,\mu} \times N_{cells}^{cap2}, M_{max}^{slot,\mu}/N_{spans}))$ PDCCH candidates or more than $C_{max}^{span}$=Floor(min$(C_{PDCCH}^{max,span,\mu} \times N_{cells}^{cap2}, C_{max}^{slot,\mu}/N_{spans}))$ non-overlapped CCEs per span for a DL scheduling cell with span-based monitoring.

In one embodiment, for option 1 or option 2 of coexistence of per-span requirements with per-slot requirements (as discussed in the first part of this disclosure), for a DL serving cell that is deactivated, Rel-15 PDCCH monitoring, e.g., slot-based minimum requirements on BDs and/or non-overlapping CCEs is assumed, that is, for deactivated DL cells, enhanced PDCCH monitoring is assumed as not being configured.

In another embodiment, for each scheduled cell, the UE may or may not monitor on the active DL BWP with SCS configuration µ of the scheduling cell more than $$M_{max}^{slot,\mu} = \min\left( M_{PDCCH}^{max,slot,\mu} \times \frac{N_{cells}^{cap}}{N_{cells}^{cap} + N_{cells}^{cap2}}, M_{PDCCH}^{total,slot,\mu} \right) PDCCH$$

candidates or more than $$C_{max}^{slot,\mu} = \min\left(C_{PDCCH}^{max,slot,\mu} \times \frac{N_{cells}^{cap}}{N_{cells}^{cap} + N_{cells}^{cap2}}, C_{PDCCH}^{total,slot,\mu}\right)$$

non-overlapped CCEs per slot, if the DL scheduling cell is not configured with enhanced PDCCH monitoring.

In an extended embodiment, for each scheduled cell, the UE may or may not monitor on the active DL BWP with SCS configuration µ of the scheduling cell more than $$M_{max}^{slot,\mu} = \min\left(M_{PDCCH}^{max,s,\mu} \times \frac{N_{cells}^{cap}}{N_{cells}^{cap} + N_{cells}^{cap2}}, M_{PDCCH}^{total,slot,\mu}\right) PDCCH$$

candidates or more than $$C_{max}^{slot,\mu} = \min\left(C_{PDCCH}^{max,s,\mu} \times \frac{N_{cells}^{cap2}}{N_{cells}^{cap} + N_{cells}^{cap2}}, C_{PDCCH}^{total,slot,\mu}\right)$$

non-overlapped CCEs per slot, if the DL scheduling cell is configured with enhanced PDCCH monitoring.

Further, the UE may or may not monitor on the active DL BWP with SCS configuration µ of the scheduling cell more than $M_{max}^{span}=\text{Floor}(\min(M_{PDCCH}^{max,span,\mu} \times N_{cells}^{cap2}, M_{max}^{slot,\mu}/N_{spans}))$ PDCCH candidates or more than $C_{max}^{span}=\text{Floor}(\min(C_{PDCCH}^{max,span,\mu} \times N_{cells}^{cap2}, C_{max}^{slot,\mu}/N_{spans}))$ non-overlapped CCEs per span for a DL scheduling cell with span-based monitoring.

In one variant of the above embodiments, for each scheduled cell, the UE may or may not monitor on the active DL BWP with SCS configuration p of the scheduling cell more than $M_{max}^{slot,\mu}=\min(M_{PDCCH}^{max,s,\mu}, M_{PDCCH}^{total,slot,\mu})$ PDCCH candidates or more than $C_{max}^{slot,\mu}=\min(C_{PDCCH}^{max,s,\mu}, C_{PDCCH}^{total,slot,\mu})$ non-overlapped CCEs per slot, if the DL scheduling cell is configured with enhanced PDCCH monitoring.

Further, the UE may or may not monitor on the active DL BWP with SCS configuration µ of the scheduling cell more than $M_{max}^{span}=\text{Floor}(\min(M_{PDCCH}^{max,span,\mu} \times N_{cells}^{cap2}, M_{max}^{slot,\mu}/N_{spans}))$ PDCCH candidates or more than $C_{max}^{span}=\text{Floor}(\min(C_{PDCCH}^{max,span,\mu} \times N_{cells}^{cap2}, C_{max}^{slot,\mu}/N_{spans}))$ non-overlapped CCEs per span for a DL scheduling cell with span-based monitoring.

In another variant of the above embodiments, for each scheduled cell, the UE may or may not monitor on the active DL BWP with SCS configuration µ of the scheduling cell more than $M_{max}^{slot,\mu}=\min(M_{PDCCH}^{max,slot,\mu}, M_{PDCCH}^{total,slot,\mu})$ PDCCH candidates or more than $C_{max}^{slot,\mu}=\min(C_{PDCCH}^{max,slot,\mu}, C_{PDCCH}^{total,slot,\mu})$ non-overlapped CCEs per slot, if the DL scheduling cell is not configured with enhanced PDCCH monitoring.

In yet another variant of the embodiment (and following the approach that the PDCCH monitoring capabilities for Rel-15 and Rel-16 monitoring configurations are assigned within their respective categories, if a UE is configured with $N_{cells,r15}^{DL,\mu,r16}$ and $N_{cells,r16}^{DL,\mu,r16}$ downlink cells with DL BWPs having SCS configuration µ (µ=0, 1, 2, 3), corresponding to Rel-15 and Rel-16 PDCCH monitoring configurations, respectively), for each scheduled cell, the UE may or may not monitor on the active DL BWP with SCS configuration µ of the scheduling cell more than $M_{max,r16}^{slot,\mu,r16}=\min(M_{PDCCH,r16}^{max,s,\mu,r16}, M_{PDCCH,r16}^{total,slot,\mu,r16})$ PDCCH candidates or more than $C_{max,r16}^{slot,\mu,r16}=\min(C_{PDCCH,r16}^{max,s,\mu,r16}, C_{PDCCH,r16}^{total,slot,\mu,r16})$ non-overlapped CCEs per slot, if the DL scheduling cell is configured with enhanced PDCCH monitoring.

Further, for each scheduled cell, the UE may or may not monitor on the active DL BWP with SCS configuration µ of the scheduling cell more than $M_{max,r16}^{slot,\mu,r16}=\min(M_{PDCCH}^{max,slot,\mu}, M_{PDCCH,r15}^{total,slot,\mu,r16})$ PDCCH candidates or more than $C_{max,r15}^{slot,\mu,r16}=\min(C_{PDCCH}^{max,slot,\mu}, C_{PDCCH,r15}^{total,slot,\mu,r16})$ non-overlapped CCEs per slot, if the DL scheduling cell is not configured with enhanced PDCCH monitoring.

In another embodiment, if a UE is only configured with $N_{cells,r16}^{DL,\mu}$ downlink cells with DL BWPs having SCS configuration µ (µ=0, 1, 2, 3), corresponding to Rel-16 PDCCH monitoring configurations, for each scheduled cell, the UE may or may not monitor on the active DL BWP with SCS configuration µ of the scheduling cell more than $M_{max,r16}^{slot,\mu}=\min(M_{PDCCH,r16}^{max,s,\mu}, M_{PDCCH,r16}^{total,slot,\mu})$ PDCCH candidates or more than $C_{max,r16}^{slot,\mu}=\min(C_{PDCCH,r16}^{max,s,\mu}, C_{PDCCH,r16}^{total,slot,\mu})$ non-overlapped CCEs per slot, if the DL scheduling cell is configured with enhanced PDCCH monitoring.

In the following, per-span limits on the number of monitored PDCCHs and the number of CCEs for channel estimation in CA cases (without translation to slot-level values) are defined. In particular, per-span limits for a given span pattern (X,Y) are defined next, for a group of cells for which the same span pattern applies. This means that these limits are dependent not only on the UE capabilities and CA configuration, but also the SS set configuration in each cell.

If a UE is configured with $N_{cells,r15}^{DL,\mu,r16}$ and $N_{cells,r16}^{DL,\mu,r16}$ downlink cells with DL BWPs having SCS configuration µ (µ=0, 1, 2, 3), corresponding to Rel-15 and Rel-16 PDCCH monitoring configurations respectively, and $N_{cells,r16}^{DL,(X,Y),\mu,r16}$ DL cells (amongst $N_{cells,r16}^{DL,\mu,r16}=\Sigma_{(X,Y)}N_{cells,r16}^{DL,(X,Y),\mu,r16}$ DL cells with DL BWPs having SCS configuration p, configured with Rel-16 PDCCH monitoring), are configured, with DL BWPs having SCS configuration µ, for which span pattern (X,Y) applies (resulting from the configured search space sets for the serving cells), In one embodiment, where the number of DL scheduling cells configured with span-based (Rel-16) PDCCH monitoring does not exceed $N_{cells,r16}^{cap-r16}$, the UE may or may not monitor, on the active DL BWP of the scheduling cell, more than $M_{PDCCH}^{total,span(X,Y),\mu,r16}=M_{PDCCH}^{max,span(X,Y),\mu}$ PDCCH candidates or more than $C_{PDCCH}^{total,span(X,Y),\mu,r16}=C_{PDCCH}^{max,span(X,Y),\mu}$ non-overlapped CCEs per span for each scheduled cell, if DL scheduling cell is configured with enhanced PDCCH monitoring.

In another embodiment, where the number of DL scheduling cells configured with span-based (Rel-16) PDCCH monitoring exceeds $N_{cells,r16}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE may or may not monitor more than $$M_{PDCCH}^{total,span(X,Y),\mu,r16} =$$

$$\left\lfloor M_{PDCCH}^{max,span(X,Y),\mu} \times N_{cells,r16}^{cap-r16} \times \frac{N_{cells,r16}^{DL,\mu,r16}}{\sum_{\mu=0}^{3} N_{cells,r16}^{DL,\mu,r16}} \times \frac{N_{cells,r16}^{DL,(X,Y),\mu,r16}}{N_{cells,r16}^{DL,\mu,r16}} \right\rfloor =$$

$$\left\lfloor M_{PDCCH}^{max,span(X,Y),\mu} \times N_{cells,r16}^{cap-r16} \times \frac{N_{cells,r16}^{DL,(X,Y),\mu,r16}}{\sum_{\mu=0}^{3} N_{cells,r16}^{DL,\mu,r16}} \right\rfloor PDCCH$$

candidates, or more than $$C_{PDCCH}^{total,span(X,Y),\mu,r16} =$$

$$\left\lfloor C_{PDCCH}^{max,span(X,Y),\mu} \times N_{cells,r16}^{cap-r16} \times \frac{N_{cells,r16}^{DL,\mu,r16}}{\sum_{\mu=0}^{3} N_{cells,r16}^{DL,\mu,r16}} \times \frac{N_{cells,r16}^{DL,(X,Y),\mu,r16}}{N_{cells,r16}^{DL,\mu,r16}} \right\rfloor =$$

$$\left\lfloor C_{PDCCH}^{max,span(X,Y),\mu} \times N_{cells,r16}^{cap-r16} \times \frac{N_{cells,r16}^{DL,(X,Y),\mu,r16}}{\sum_{\mu=0}^{3} N_{cells,r16}^{DL,\mu,r16}} \right\rfloor$$

non-overlapped CCEs per span on the active DL BWP(s) of scheduling cell(s) from the $N_{cells,r16}^{DL,(X,Y),\mu,r16}$ downlink cells.

In another embodiment, for each scheduled cell, the UE may or may not monitor on the active DL BWP with SCS configuration µ of the scheduling cell more than $M_{PDCCH}^{span(X,Y),\mu,r16}=\min(M_{PDCCH}^{max,span(X,Y),\mu}, M_{PDCCH}^{total,span(X,Y),\mu,r16})$ PDCCH candidates or more than $C_{PDCCH}^{span(X,Y),\mu,r16}=\min(C_{PDCCH}^{max,span(X,Y),\mu}, C_{PDCCH}^{total,span(X,Y),\mu,r16})$ non-overlapped CCEs per span, for span pattern (X,Y), if the DL scheduling cell is configured with enhanced PDCCH monitoring.

Further, if a UE is configured with only $N_{cells,r16}^{DL,\mu}$ downlink cells with DL BWPs having SCS configuration µ (µ=0, 1, 2, 3), corresponding to Rel-16 PDCCH monitoring configurations, and $N_{cells,r16}^{DL,(X,Y),\mu}$ cells (amongst $N_{cells,r16}^{DL,\mu}=\sum_{(X,Y)} N_{cells,r16}^{DL,(X,Y),\mu}$ DL cells with DL BWPs having SCS configuration µ, configured with Rel-16 PDCCH monitoring), are configured, with DL BWPs having SCS configuration µ, for which span pattern (X,Y) applies (resulting from the configured search space sets for the serving cells)

In one embodiment, where the number of DL scheduling cells configured with span-based (Rel-16) PDCCH monitoring does not exceed $N_{cells}^{cap-r16}$, the UE may or may not monitor, on the active DL BWP of the scheduling cell, more than $M_{PDCCH}^{total,span(X,Y),\mu}=M_{PDCCH}^{max,span(X,Y),\mu}$ PDCCH candidates or more than $C_{PDCCH}^{total,span(X,Y),\mu}=C_{PDCCH}^{max,span(X,Y),\mu}$ non-overlapped CCEs per span for each scheduled cell.

In another embodiment, where the number of DL scheduling cells configured with span-based (Rel-16) PDCCH monitoring exceeds $N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE may or may not monitor more than $$M_{PDCCH}^{total,span(X,Y),\mu} =$$

$$\left\lfloor M_{PDCCH}^{max,span(X,Y),\mu} \times N_{cells}^{cap-r16} \times \frac{N_{cells,r16}^{DL,\mu}}{\sum_{\mu=0}^{3} N_{cells,r16}^{DL,\mu}} \times \frac{N_{cells,r16}^{DL,(X,Y),\mu}}{N_{cells,r16}^{DL,\mu}} \right\rfloor =$$

$$\left\lfloor M_{PDCCH}^{max,span(X,Y),\mu} \times N_{cells}^{cap-r16} \times \frac{N_{cells,r16}^{DL,(X,Y),\mu}}{\sum_{\mu=0}^{3} N_{cells,r16}^{DL,\mu}} \right\rfloor PDCCH$$

candidates, or more than $$C_{PDCCH}^{total,span(X,Y),\mu} =$$

$$\left\lfloor C_{PDCCH}^{max,span(X,Y),\mu} \times N_{cells}^{cap-r16} \times \frac{N_{cells,r16}^{DL,\mu}}{\sum_{\mu=0}^{3} N_{cells,r16}^{DL,\mu}} \times \frac{N_{cells,r16}^{DL,(X,Y),\mu}}{N_{cells,r16}^{DL,\mu}} \right\rfloor =$$

$$\left\lfloor C_{PDCCH}^{max,span(X,Y),\mu} \times N_{cells}^{cap-r16} \times \frac{N_{cells,r16}^{DL,(X,Y),\mu}}{\sum_{\mu=0}^{3} N_{cells,r16}^{DL,\mu}} \right\rfloor$$

non-overlapped CCEs per span on the active DL BWP(s) of scheduling cell(s) from the $N_{cells,r16}^{DL,(X,Y),\mu}$ downlink cells.

In another embodiment, for each scheduled cell, the UE may or may not monitor on the active DL BWP with SCS configuration µ of the scheduling cell more than $M_{PDCCH,cell}^{span(X,Y),\mu}=\min(M_{PDCCH}^{max,span(X,Y),\mu}, M_{PDCCH}^{total,span(X,Y),\mu})$ PDCCH candidates or more than $C_{PDCCH,cell}^{span(X,Y),\mu}=\min(C_{PDCCH}^{max,span(X,Y),\mu}, C_{PDCCH}^{total,span(X,Y),\mu})$ non-overlapped CCEs per span, for span pattern (X,Y), if the DL scheduling cell is configured with enhanced PDCCH monitoring.

In one embodiment, for option 1 of coexistence of per-span requirements with per-slot requirements (as discussed in the first part of this disclosure), the limits on the number of non-overlapping CCEs and/or number of blind decodes are determined for slot-based and span-based monitoring configurations separately by applying Rel-15 rules and counting the number of DL cells with slot-based and span-based monitoring configurations, such that a cell with span-based monitoring (that, by definition of Option 1, also includes slot-based monitoring) contributes to both counters for DL cells with span-based or slot-based monitoring.

In one embodiment, when configured with span-level monitoring in any DL scheduling cell, a UE does not expect to be configured CSS sets that result to corresponding total, or per scheduled cell, numbers of monitored PDCCH candidates and non-overlapped CCEs per slot that exceed the corresponding maximum numbers per slot (e.g., as disclosed in the previous embodiments and examples).

In addition or as an alternative, for CSS sets associated with (or applicable to) span-level monitoring, a UE does not expect to be configured CSS sets that result to corresponding total, or per scheduled cell, numbers of monitored PDCCH candidates and non-overlapped CCEs per slot that exceed the corresponding maximum numbers per span.

In an extended example, when configured with span-level monitoring in any DL scheduling cell, for same cell scheduling or for cross-carrier scheduling where a scheduling cell and scheduled cell(s) have DL BWPs with same SCS configuration µ, a UE does not expect a number of PDCCH candidates, and a number of corresponding non-overlapped CCEs per slot on a secondary cell to be larger than the corresponding numbers that the UE is capable of monitoring on the secondary cell per slot (e.g., as disclosed in the previous embodiments and examples).

In one embodiment, for cross-carrier scheduling, the number of PDCCH candidates for monitoring and the number of non-overlapped CCEs per slot are separately counted for each scheduled cell, and for each of Rel-15 monitoring requirements/capabilities and enhanced (e.g., per-span) monitoring requirements/capabilities.

Accordingly, in one embodiment, the UE is provided with the corresponding PDCCH monitoring configuration for the scheduled cells. For this purpose, the new RRC parameter PDCCHMonitoringCapability should be provided in the PDCCH-Config IE for the scheduled cell (in addition to searchSpacesToAddModList and searchSpacesToReleaseList).

(Note: in Subclause 6.3.2 of [2] we currently have the following:

PDCCH-Config

The IE PDCCH-Config is used to configure UE specific PDCCH parameters such as control resource sets (CORESET), search spaces and additional parameters for acquiring the PDCCH. If this IE is used for the scheduled cell in case of cross carrier scheduling, the fields other than searchSpacesToAddModList, searchSpacesToReleaseList are absent.)

In another embodiment, when the UE is provided with Rel-16 PDCCH monitoring capability configuration and carrier aggregation, cross-carrier scheduling is limited to cases with scheduling cell and scheduled cell have the same PDCCH monitoring capability configuration. That is, for both scheduling cell and scheduled cell, the UE is provided with either Rel-15 or Rel-16 PDCCH monitoring capability configuration.

Further, in yet another embodiment, when the UE is provided with Rel-16 PDCCH monitoring capability configuration and carrier aggregation, cross-carrier scheduling between two DL cells for which the UE is provided with Rel-16 PDCCH monitoring configuration is limited to cases in which the scheduling cell and the scheduled cell are provided with active DL BWPs with same SCS configuration and the same applicable span-pattern (X,Y).

Next, embodiments elaborating the dropping rules considering span-based monitoring requirements, and the previous embodiments and examples, are disclosed. For all search space sets within a slot n associated to the configured downlink cells in which the UE is to perform PDCCH monitoring according to Rel-15 slot-based requirements, denote by $S_{CSS}$ a set of CSS sets with cardinality of $I_{CSS}$ and by $S_{USS}$ a set of USS sets with cardinality of $J_{USS}$.

For the search space sets within a slot n associated to the configured downlink cells in which the UE needs to perform PDCCH monitoring according to the per-span requirements, denote by $S_{CSS,span}$ a set of CSS sets with cardinality of $I_{CSS,span}$ and by $S_{USS,span}$ a set of USS sets with cardinality of $J_{USS,span}$.

Further, for the search space sets within a span (e.g., of slot n) associated to the configured downlink cells in which the UE needs to perform PDCCH monitoring according to the per-span requirements, for a given span, denote by $S_{CSS,span}^{span}$ a set of CSS sets with cardinality of $I_{CSS,span}^{span}$ and by $S_{USS,span}^{span}$ a set of USS sets with cardinality of $J_{USS,span}^{span}$.

The indexing of USS sets $S_j$, $0 \leq j \leq J_{USS}$ in $S_{USS}$ is according to an ascending order of the search space set index.

In one example, for a given span, the indexing of USS sets $s_k^{span}$, $0 \leq k < J_{USS,span}$, and/or $s_b^{span,span}$, $0 \leq b < J_{USS,span}^{span}$ in $S_{USS,span}$ and $S_{USS,span}^{span}$, respectively, is according to an ascending order of the search space set index.

In another example, for a given span, the location of USS sets $s_k^{span}$, $0 \leq k < J_{USS,span}$, in $S_{USS,span}$ is according to the location of the monitoring spans within a slot, for the SS set. For example, a SS set with monitoring spans within the first F symbols (F={2, 3, ...}) are prioritized over other SS sets.

Let's denote by $M_{S_{css}(i)}^{(L)}$, $0 \leq i < I_{css}$, the number of counted PDCCH candidates for monitoring for CSS set $S_{CSS}(i)$ and by $M_{S_{css}(j)}^{(L)}$, $0 \leq j < J_{uss}$, the number of counted PDCCH candidates for monitoring for USS set $S_{USS}(j)$.

Denote by $M_{S_{CSS,span}(l)}^{(L)}$, $0 \leq l < I_{CSS,span}$, the number of counted PDCCH candidates for monitoring for CSS set $S_{CSS,span}(l)$ and by $M_{S_{USS,span}(k)}^{(L)}$, $0 \leq k < J_{USS,span}$, the number of counted PDCCH candidates for monitoring for USS set $S_{USS,span}(k)$.

Denote by $M_{S_{CSS,span}^{span}(v)}^{(L),span}$, $0 \leq v < I_{CSS,span}^{span}$, the number of counted PDCCH candidates for monitoring for CSS set $S_{CSS,span}^{span}(v)$ and by $M_{S_{USS,span}^{span}(w)}^{(L),span}$, $0 \leq w < J_{USS,span}^{span}$, the number of counted PDCCH candidates for monitoring for USS set $S_{USS,span}^{span}(w)$.

In one embodiment, a UE first monitors a total of $$M_{PDCCH}^{CSS} = \sum_{i=0}^{I_{css}-1} \sum_L M_{S_{css}(i)}^{(L)} + \sum_{l=0}^{I_{CSS,span}-1} \sum_L M_{S_{CSS,span}(l)}^{(L)}$$

PDCCH candidates for the CSS sets, requiring a total of $C_{PDCCH}^{CSS}$ non-overlapping CCEs in a slot.

Alternatively, if $I_{CSS}$=0, a UE first monitors a total of $M_{PDCCH,span}^{CSS} = \sum_{l=0}^{I_{CSS,span}^{span}-1} \sum_L M_{S_{CSS,span}^{span}(l)}^{(L),span}$ PDCCH candidates for the CSS sets, requiring a total of $C_{PDCCH,span}^{CSS}$ non-overlapping CCEs, for a given span within a slot. Then, the slot-level total number of CSS candidates can be determined by the sum over all $M_{PDCCH,span}^{CSS}$ and $M_{PDCCH,span}^{CSS}$ over all the spans in a slot.

In the following embodiment on dropping:

Dropping happens at SS set level and per-slot.

Limits on #BDs and #CCEs, even for span-based requirements, are translated to per-slot.

Prioritization in the following order: all CSS sets first selected for monitoring, then USS sets associated with span-based requirements, if applicable (e.g., the UE is configured with span-level monitoring in the primary cell), then USS sets associated with slot-level requirements, if applicable (e.g., UE is configured with both span- and slot-level monitoring in primary cell or only slot-level monitoring in primary cell).

In another variant of the embodiment, the dropping is performed at span-level instead of slot-level for USS if the UE is configured to monitor span-level monitoring in the primary cell. In this case, the indexing of a USS set is further refined based on the span-index within a slot depending on the configured monitoring occasions for the USS set.

In an example of the above dropping mechanism, the dropping of USS sets can be performed on a span-basis, wherein candidates for USS sets are indexed over the slot duration across one or more monitoring occasions.

In one example of the embodiment, the UE allocates PDCCH candidates for monitoring to USS sets for the primary cell having an active DL BWP with SCS configuration μ in slot n according to the following pseudocode. A UE does not expect to monitor PDCCH in a USS set without allocated PDCCH candidates for monitoring.

Denote by $V_{CCE}(S_{uss}(j))$ and $V_{CCE}(S_{USS,span}(k))$ the set of non-overlapping CCEs for search space sets $S_{uss}(j)$ and $S_{USS,span}(k)$, respectively, and by $\mathcal{C}(V_{CCE}(S_{uss}(j)))$ and $C(V_{CCE}(S_{USS,span}(k)))$, the cardinality of $V_{CCE}(S_{uss}(j))$ and $V_{CCE}(S_{USS,span}(k))$, respectively, where the non-overlapping CCEs for search space set $S_{USS,span}(k)$ are determined considering the allocated PDCCH candidates for monitoring for the CSS sets and the allocated PDCCH candidates for monitoring for all search space sets $S_{USS,span}(g)$, $0 \leq g \leq k$, and the non-overlapping CCEs for search space set $S_{uss}(j)$ are determined considering the allocated PDCCH candidates for monitoring for the CSS sets and the allocated PDCCH candidates for monitoring for all search space sets $S_{USS,span}(h)$, $0 \leq h \leq j$, and $S_{USS}(d)$, $0 \leq d \leq j$, set $$M_{PDCCH}^{USS} = \min\left(M_{PDCCH}^{max,slot,\mu} \times \frac{N_{cells}^{cap}}{N_{cells}^{cap} + N_{cells}^{cap2}},\right.$$

$$\left. M_{PDCCH}^{max,s,\mu} \times \frac{N_{cells}^{cap2}}{N_{cells}^{cap} + N_{cells}^{cap2}}, M_{PDCCH}^{total,slot,\mu}\right) - M_{PDCCH}^{CSS}$$

$$C_{PDCCH}^{USS} = \min\left(C_{PDCCH}^{max,slot,\mu} \times \frac{N_{cells}^{cap}}{N_{cells}^{cap} + N_{cells}^{cap2}},\right.$$

$$\left. C_{PDCCH}^{max,s,\mu} \times \frac{N_{cells}^{cap2}}{N_{cells}^{cap} + N_{cells}^{cap2}}, C_{PDCCH}^{total,slot,\mu}\right) - C_{PDCCH}^{CSS}$$

In another embodiment, set $$M_{PDCCH}^{USS} = \min(M_{PDCCH}^{max,slot,\mu}, M_{PDCCH}^{max,s,\mu}, M_{PDCCH}^{total,slot,\mu}) - M_{PDCCH}^{CSS}$$

$$C_{PDCCH}^{USS} = \min(C_{PDCCH}^{max,slot,\mu}, C_{PDCCH}^{max,s,\mu}, C_{PDCCH}^{total,slot,\mu}) - C_{PDCCH}^{CSS}$$

Set j=0 and k=0 while $\Sigma_L M_{S_{USS,span}(k)}^{(L)} \leq M_{PDCCH}^{USS}$ and $C(V_{CCE}(S_{USS,span}(k))) \leq C_{PDCCH}^{USS}$, allocate $\Sigma_L M_{S_{USS,span}(k)}^{(L)}$ PDCCH candidates for monitoring to USS set $S_{USS,span}(k)$.

while $\Sigma_L M_{S_{USS}(j)}^{(L)} \leq M_{PDCCH}^{USS} - \Sigma_{g=0}^{j} \Sigma_L M_{S_{USS,span}(g)}^{(L)}$ AND $C(V_{CCE}(S_{USS}(j))) \leq C_{PDCCH}^{USS} - \Sigma_{g=0}^{j} C(V_{CCE}(S_{USS,span}(g)))$, allocate $\Sigma_L M_{S_{USS}(j)}^{(L)}$ PDCCH candidates for monitoring to USS set $S_{USS}(j)$.

$$M_{PDCCH}^{uss} = M_{PDCCH}^{uss} - \sum_L M_{S_{uss}(j)}^{(L)} - \sum_L M_{S_{USS,span}(k)}^{(L)};$$

$$C_{PDCCH}^{uss} = C_{PDCCH}^{uss} - C(V_{CCE}(S_{uss}(j))) - C(V_{CCE}(S_{USS,span}(k)));$$

$$j = j+1; k = k+1;$$

end while

In another embodiment, the dropping mechanism can be as below:

Dropping happens at SS set level and per-span instead of per-slot.

Limits on #BDs and #CCEs, even for span-based requirements, are kept.

Prioritization is only between CSS per span and USS per span instead of per-slot. Especially since J_USS and I_CSS are 0.

In an example of the above embodiment, $I_{CSS}=0$, and a UE first span monitors a total of $M_{PDCCH}^{CSS} = \Sigma_{l=0}^{I_{CSS,span}^{span}-1} \Sigma_L M_{S_{CSS,span}(l)}^{(L),span}$ PDCCH candidates for the CSS sets, requiring a total of $C_{PDCCH}^{CSS}$ non-overlapping CCEs in a span. Further $J_{USS}=0$, and the UE allocates PDCCH candidates for monitoring to USS sets for the primary cell having an active DL BWP with SCS configuration $\mu$ in a span (e.g., in slot n) according to the following pseudocode. A UE does not expect to monitor PDCCH in a USS set without allocated PDCCH candidates for monitoring.

Denote by $V_{CCE}(S_{USS,span}^{span}(k))$ the set of non-overlapping CCEs for search space set $S_{USS,span}^{span}(k)$, and by $C(V_{CCE}(S_{USS,span}^{span}(k)))$, the cardinality of $V_{CCE}(S_{USS,span}^{span}(k))$, where the non-overlapping CCEs for search space set $S_{USS,span}^{span}(k)$ are determined considering the allocated PDCCH candidates for monitoring for the CSS sets and the allocated PDCCH candidates for monitoring for all search space sets $S_{USS,span}^{span}(g)$, $0 \leq g \leq k$.

Set $$M_{PDCCH}^{USS} = \min(M_{PDCCH}^{max,span,\mu}, M_{PDCCH}^{total,slot,\mu}/(\text{total number of spans in slot})) - M_{PDCCH}^{CSS},$$

and $$C_{PDCCH}^{USS} = \min(C_{PDCCH}^{max,span,\mu}, C_{PDCCH}^{total,slot,\mu}/(\text{total number of spans in slot})) - C_{PDCCH}^{CSS},$$

Where $M_{PDCCH}^{max,span,\mu}$ an $C_{PDCCH}^{max,span,\mu}$ denotes the maximum number of monitored PDCCH candidates in a span and the corresponding numbers of non-overlapping CCEs, per serving cell for a DL BWP with SCS configuration $\mu$, as defined for non-CA case.

Set w=0 while $\Sigma_L M_{S_{USS,span}^{span}(w)}^{(L),span} \leq M_{PDCCH}^{USS}$ AND $C(V_{CCE}(S_{USS,span}^{span}(w))) \leq C_{PDCCH}^{USS}$, allocate $\Sigma_L M_{S_{USS,span}^{span}(w)}^{(L),span}$ PDCCH candidates for monitoring to USS set $S_{USS,span}^{span}(w)$.

$$M_{PDCCH}^{USS} = M_{PDCCH}^{USS} - \Sigma_L M_{S_{USS,span}^{span}(w)}^{(L),span};$$

$$C_{PDCCH}^{USS} = C_{PDCCH}^{USS} - C(V_{CCE}(S_{USS,span}^{span}(w)));$$

w=w+1;

end while

In another example of the above embodiment, for the search space sets within a given span (e.g., of slot n) associated to the PCell (or PCScell in DC) in which the UE is configured to perform PDCCH monitoring according to the per-span requirements, denote by $S_{CSS,span}^{span}$ a set of CSS sets with cardinality of $I_{CSS,span}^{span}$ and by $S_{USS,span}^{span}$ a set of USS sets with cardinality of $J_{USS,span}^{span}$.

For a given span, the indexing of USS sets $S_b^{span,span}$, $0 \leq b < J_{USS,span}^{span}$ in $S_{USS,span}^{span}$, can be according to an ascending order of the search space set index.

Denote by $M_{S_{CSS,span}^{span}(v)}^{(L),span}$, $0 \leq v < I_{CSS,span}^{span}$, the number of counted PDCCH candidates for monitoring for CSS set $S_{CSS,span}^{span}(v)$ and by $M_{S_{USS,span}^{span}(w)}^{(L),span}$, $0 \leq w < J_{USS,span}^{span}$, the number of counted PDCCH candidates for monitoring for USS set $S_{USS,span}^{span}(w)$.

A UE first monitors a total of $M_{PDCCH}^{CSS} = \Sigma_{l=0}^{I_{CSS,span}^{span}-1} \Sigma_L M_{S_{CSS,span}^{span}(l)}^{(L),span}$ PDCCH candidates for the CSS sets, requiring a total of $C_{PDCCH}^{CSS}$ non-overlapping CCEs in a span. Further the UE allocates PDCCH candidates for monitoring to USS sets for the primary cell having an active DL BWP with SCS configuration $\mu$ in a span (e.g., in slot n) according to the following pseudocode. A UE does not expect to monitor PDCCH in a USS set without allocated PDCCH candidates for monitoring.

Denote by $V_{CCE}(S_{USS,span}^{span}(w))$ the set of non-overlapping CCEs for search space set $S_{USS,span}^{span}(w)$, and by $C(V_{CCE}(S_{USS,span}^{span}(w)))$, the cardinality of $V_{CCE}(S_{USS,span}^{span}(w))$, where the non-overlapping CCEs for search space set $S_{USS,span}^{span}(w)$ are determined considering the allocated PDCCH candidates for monitoring for the CSS sets and the allocated PDCCH candidates for monitoring for all search space sets $S_{USS,span}^{span}(g)$, $0 \leq g \leq w$.

Set $$M_{PDCCH}^{USS} = M_{max,r16}^{span} - M_{PDCCH}^{CSS}, \text{ and}$$

$$C_{PDCCH}^{USS} = C_{max,r16}^{span} - C_{PDCCH}^{CSS},$$

if a UE is only configured with downlink cells with DL BWPs having SCS configuration μ (μ=0, 1, 2, 3), corresponding to Rel-16 PDCCH monitoring configurations, or set $$M_{PDCCH}^{USS} = M_{max,r16}^{span,r16} - M_{PDCCH}^{CSS}, \text{ and}$$

$$C_{PDCCH}^{USS} = C_{max,r16}^{span,r16} - C_{PDCCH}^{CSS},$$

if a UE is configured with downlink cells with DL BWPs having SCS configuration μ (μ=0, 1, 2, 3), corresponding to both Rel-15 and Rel-16 PDCCH monitoring configurations.

Set w=0
while $\Sigma_L M_{S_{USS,span}(w)}^{(L),span} \leq M_{PDCCH}^{USS}$ HAND $C(V_{CCE}(S_{USS,span}^{span}(w))) \leq C_{PDCCH}^{USS}$,
allocate $\Sigma_L M_{S_{USS,span}(w)}^{(L),span}$ PDCCH candidates for monitoring to USS set $S_{USS,span}^{span}(w)$.

$$M_{PDCCH}^{USS} = M_{PDCCH}^{USS} - \Sigma_L M_{S_{USS,span}(w)}^{(L),span};$$

$$C_{PDCCH}^{USS} = C_{PDCCH}^{USS} - C(V_{CCE}(S_{USS,span}^{span}(w)));$$

w=w+1;

end while

In another variant of the above embodiment, a UE first monitors a total of $M_{PDCCH}^{CSS} = \Sigma_{l=0}^{I_{CSS,span}^{span}-1} \Sigma_L M_{S_{CSS,span}(l)}^{(L),span}$ PDCCH candidates for the CSS sets, requiring a total of $C_{PDCCH}^{CSS}$ non-overlapping CCEs in a span. Further the UE allocates PDCCH candidates for monitoring to USS sets for the primary cell having an active DL BWP with SCS configuration μ in a span (e.g., in slot n) according to the following pseudocode. A UE does not expect to monitor PDCCH in a USS set without allocated PDCCH candidates for monitoring.

Set $$M_{PDCCH}^{USS} = M_{PDCCH,cell}^{span(X,Y),\mu} - M_{PDCCH}^{CSS}, \text{ and}$$

$$C_{PDCCH}^{USS} = C_{PDCCH,cell}^{span(X,Y),\mu} - C_{PDCCH}^{CSS},$$

if a UE is only configured with downlink cells with DL BWPs having SCS configuration μ (μ=0, 1, 2, 3), corresponding to Rel-16 PDCCH monitoring configurations (where $M_{PDCCH,cell}^{span(X,Y),\mu} = \min(M_{PDCCH}^{max,span(X,Y),\mu}, M_{PDCCH}^{total,span(X,Y),\mu})$ and $C_{PDCCH,cell}^{span(X,Y),\mu} = \min(C_{PDCCH}^{max,span(X,Y),\mu}, C_{PDCCH}^{total,span(X,Y),\mu})$), or set $$M_{PDCCH}^{USS} = M_{PDCCH,cell}^{span(X,Y),\mu,r16} - M_{PDCCH}^{CSS}, \text{ and}$$

$$C_{PDCCH}^{USS} = C_{PDCCH,cell}^{span(X,Y),\mu,r16} - C_{PDCCH}^{CSS},$$

if a UE is configured with downlink cells with DL BWPs having SCS configuration μ (μ=0, 1, 2, 3), corresponding to both Rel-15 and Rel-16 PDCCH monitoring configurations (where $M_{PDCCH,cell}^{span(X,Y),\mu,r16} = \min(M_{PDCCH}^{max,span(X,Y),\mu}, M_{PDCCH}^{total,span(X,Y),\mu,r16})$ and $C_{PDCCH,cell}^{span(X,Y),\mu,r16} = \min(C_{PDCCH}^{max,span(X,Y),\mu}, C_{PDCCH}^{total,span(X,Y),\mu,r16})$).

Set w=0
while $\Sigma_L M_{S_{USS,span}(w)}^{(L),span} \leq M_{PDCCH}^{USS}$ AND $C(V_{CCE}(S_{USS,span}^{span}(w))) \leq C_{PDCCH}^{USS}$, allocate $\Sigma_L M_{S_{USS,span}(w)}^{(L),span}$ PDCCH candidates for monitoring to USS set $S_{USS,span}^{span}(w)$.

$$M_{PDCCH}^{USS} = M_{PDCCH}^{USS} - \Sigma_L M_{S_{USS,span}(w)}^{(L),span};$$

$$C_{PDCCH}^{USS} = C_{PDCCH}^{USS} - C(V_{CCE}(S_{USS,span}^{span}(w)));$$

w=w+1;

end while

In an extended example, instead of summation over all ALs, $\Sigma_L M_{S_{USS,span}(w)}^{(L),span}$, which implies dropping of all PDCCH candidates of SS set within a span, only a subset of PDCCH candidates corresponding to that particular SS set are dropped. In one example, the summation can be defined only over ALs below or above some certain thresholds.

In yet another variant of the above embodiment, the UE allocates PDCCH candidates for monitoring to USS sets for the primary cell having an active DL BWP with SCS configuration μ in a slot if the UE is not provided PDCCH-MonitoringCapabilityConfig for the primary cell or if the UE is provided PDCCHMonitoringCapabilityConfig=R15 PDCCH monitoring capability for all serving cells, or in a span if the UE is provided PDCCHMonitoringCapabilityConfig=R16 PDCCH monitoring capability for the primary cell, according to the following pseudocode. A UE does not expect to monitor PDCCH in a USS set without allocated PDCCH candidates for monitoring.

For all search space sets within a slot n for PDCCH candidate allocation in a slot, or within a span (X,Y) in slot n for PDCCH candidate allocation in a span, denote by $S_{css}$ a set of CSS sets with cardinality of $I_{css}$ and by $S_{uss}$ a set of USS sets with cardinality of $J_{uss}$. The location of USS sets $S_j$, $0 \leq j < J_{uss}$, in $S_{uss}$ is according to an ascending order of the search space set index. Denote by $M_{S_{css}(i)}^{(L)}$, $0 \leq i < I_{css}$, the number of counted PDCCH candidates for monitoring for CSS set $S_{css}(i)$ and by $M_{S_{uss}(j)}^{(L)}$, $0 \leq j < J_{uss}$, the number of counted PDCCH candidates for monitoring for USS set $S_{uss}(j)$. For the CSS sets, a UE monitors $$M_{PDCCH}^{CSS} = \sum_{i=0}^{I_{css}-1} \sum_L M_{S_{css}(i)}^{(L)}$$

PDCCH candidates requiring a total of $C_{PDCCH}^{CSS}$ non-overlapping CCEs in a slot.

Denote by $V_{CCE}(S_{uss}(j))$ the set of non-overlapping CCEs for search space set $S_{uss}(j)$ and by $C(V_{CCE}(S_{uss}(j)))$ the cardinality of $V_{CCE}(S_{uss}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \leq k \leq j$.

Set $$M_{PDCCH}^{USS} = M_{PDCCH,cell}^{span(X,Y),\mu} - M_{PDCCH}^{CSS}, \text{ and}$$

$$C_{PDCCH}^{USS} = C_{PDCCH,cell}^{span(X,Y),\mu} - C_{PDCCH}^{CSS},$$

if a UE is only configured with downlink cells with DL BWPs having SCS configuration μ (μ=0, 1, 2, 3), corresponding to Rel-16 PDCCH monitoring configurations (where $M_{PDCCH,cell}^{span(X,Y),\mu} = \min(M_{PDCCH}^{max,span(X,Y),\mu}, M_{PDCCH}^{total,span(X,Y),\mu})$ and $C_{PDCCH,cell}^{span(X,Y),\mu} = \min(C_{PDCCH}^{max,span(X,Y),\mu}, C_{PDCCH}^{total,span(X,Y),\mu})$), or set $$M_{PDCCH}^{USS} = M_{PDCCH,cell}^{span(X,Y),\mu,r16} - M_{PDCCH}^{CSS}, \text{ and}$$

$$C_{PDCCH}^{USS} = C_{PDCCH,cell}^{span(X,Y),\mu,r16} - C_{PDCCH}^{CSS},$$

if a UE is configured with downlink cells with DL BWPs having SCS configuration µ (µ=0, 1, 2, 3), corresponding to both Rel-15 and Rel-16 PDCCH monitoring configurations (where $M_{PDCCH,cell}^{span(X,Y),\mu,r16} = \min(M_{PDCCH}^{max,span(X,Y),\mu}, M_{PDCCH}^{total,span(X,Y),\mu,r16})$ and $C_{PDCCH,cell}^{span(X,Y),\mu,r16} = \min(C_{PDCCH}^{max,span(X,Y),\mu}, C_{PDCCH}^{total,span(X,Y),\mu,r16})$).

Set j=0
while $$\sum_L M_{S_{uss}(j)}^{(L)} \leq M_{PDCCH}^{uss}$$

AND $\ell(V_{CEE}(S_{uss}(j))) \leq C_{PDCCH}^{uss}$
allocate $$\sum_L M_{S_{uss}(j)}^{(L)}$$

PDCCH candidates for monitoring to USS set $S_{uss}(j)$ $$M_{PDCCH}^{uss} = M_{PDCCH}^{uss} \sum_L M_{S_{uss}(j)}^{(L)};$$

$$C_{PDCCH}^{uss} = C_{PDCCH}^{uss}; C(V_{CCE}(S_{uss}(j)));$$

$$j = j + 1;$$

end while

Figure 3:
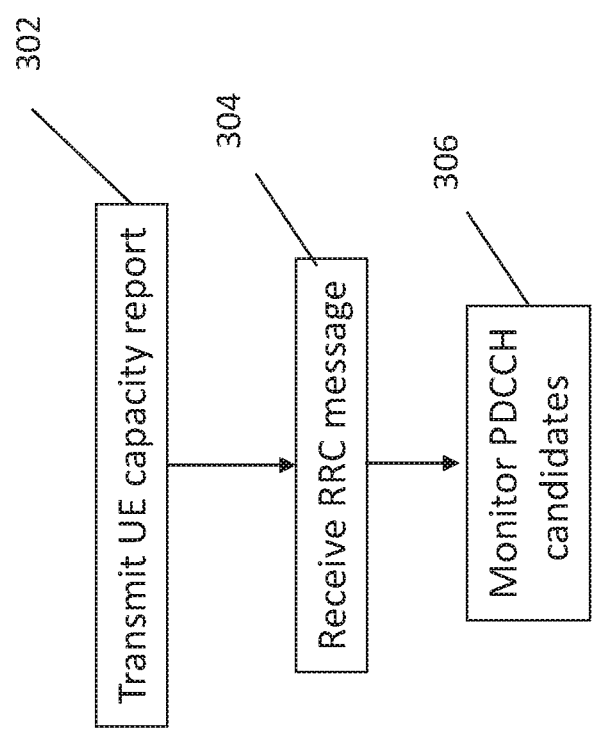
FIG. 3 illustrates a method of monitoring PDCCH candidates in accordance with some embodiments.

FIG. 3 illustrates a method of monitoring PDCCH candidates in accordance with some embodiments. The additional operations, such as that described above may be present but are not shown for succinctness. At operation 302, the UE may transmit, and the gNB (serving cell) may receive, UE capacity information in UE capacity report. The UE capacity information may contain information elements such as those described above. In response to reception of the UE capacity information, at operation 304, the gNB (serving cell) may transmit, and the UE may receive, an RRC message. The RRC message may contain information elements such as those described above. Based on this, the serving cell, as well as additional serviced cells may transmit PDCCHs. The UE may at operation 306 monitor PDCCH candidates in accordance with information in the RRC message and UE capacity information, as well as additional RRC messages. Note that transmission of a message (e.g., any of the messages described herein) by a transmitting entity (e.g., gNB/UE) may include encoding of the message before transmission by the transmitting entity: similarly, reception of a message by a receiving entity (e.g., UE/gNB) may include decoding of the message after reception by the receiving entity.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Thus, at least one of A or B, includes one or more of A, one or more of B, or one or more of A and one or more of B. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a 5$^{th}$ generation NodeB (gNB) configured to operate as a serving cell for a user equipment (UE), the apparatus comprising:
   processing circuitry to configure the gNB to:
      receive, from the UE, UE capability information indicating a capacity to monitor a physical downlink control channel (PDCCH), the UE capability information indicating whether the UE has a carrier aggregation capability over multiple downlink cells, the UE capability information further indicating a maximum number of PDCCH candidates that the UE is configured to monitor per span when the UE is configured for carrier aggregation operation over multiple downlink cells; and
send, to the UE based on the UE capability information, a radio resource control (RRC) message comprising an indication to monitor a PDCCH on the serving cell for the maximum number of PDCCH candidates, the indication comprising one of a per slot indication and a per span indication; and
memory configured to store the RRC message.

2. The apparatus of claim 1, wherein when the indication is the per span indication, the UE is configured to monitor the maximum number of PDCCH candidates per span.

3. The apparatus of claim 1, wherein when the indication is the per slot indication, the UE is configured to monitor the maximum number of PDCCH candidates per slot.

4. The apparatus of claim 1, wherein the RRC message further indicates a maximum number of non-overlapped control channel elements (CCEs) that the UE is configured to monitor per span when the UE is configured for carrier aggregation operation over multiple downlink cells.

5. The apparatus of claim 1, wherein the RRC message further indicates a maximum number of non-overlapped control channel elements (CCEs) that the UE is configured to monitor per slot when the UE is configured for carrier aggregation operation over multiple downlink cells.

6. The apparatus of claim 1, wherein the UE capability information further indicates a maximum number of non-overlapped control channel elements (CCEs) that the UE is configured to monitor per span when the UE is configured for carrier aggregation operation over multiple downlink cells.

7. The apparatus of claim 1, wherein the UE capability information further indicates a maximum number of non-overlapped control channel elements (CCEs) that the UE is configured to monitor per slot when the UE is configured for carrier aggregation operation over multiple downlink cells.

8. The apparatus of claim 1, wherein the RRC message further comprises a maximum number of monitored PDCCH candidates in a span for combination (X, Y) for a downlink bandwidth part (BWP) with subcarrier spacing (SCS) configuration $\mu$ for a cell.

9. The apparatus of claim 1, wherein the RRC message limits configuration of common search space (CSS) sets that result in corresponding total, or per scheduled cell, numbers of monitored PDCCH candidates and non-overlapped control channel elements (CCEs) per slot or per span to not exceed the corresponding maximum numbers per slot or per span, respectively.

10. The apparatus of claim 1, wherein for a set of PDCCH candidates for the UE to monitor for all search space sets within a slot or within a span in the slot, where Suss is a set of UE-specific search space (USS) sets with a cardinality of Juss, a location of USS sets, $0 \le j < Juss$ in Suss is according to an ascending order of a search space set index.

11. A non-transitory computer-readable storage medium that stores instructions for execution by one or more processors of a $5^{th}$ generation NodeB (gNB), the instructions when executed configure the one or more processors to configure the gNB to operate as a serving cell for a user equipment (UE) to:
receive, from the UE, UE capability information indicating a capacity to monitor a physical downlink control channel (PDCCH), the UE capability information indicating whether the UE has a carrier aggregation capability over multiple downlink cells, the UE capability information further indicating a maximum number of PDCCH candidates that the UE is configured to monitor per span when the UE is configured for carrier aggregation operation over multiple downlink cells; and
send, to the UE based on the UE capability information, a radio resource control (RRC) message comprising an indication to monitor a PDCCH on the serving cell for the maximum number of PDCCH candidates, the indication comprising one of a per slot indication and a per span indication.

12. The medium of claim 11, wherein the UE capability information indicates a maximum number of PDCCH candidates that the UE is configured to monitor per slot when the UE is configured for carrier aggregation operation over multiple downlink cells.

13. The medium of claim 11, wherein the UE capability information further indicates a maximum number of non-overlapped CCEs that the UE is configured to monitor per span when the UE is configured for carrier aggregation operation over multiple downlink cells.

14. The medium of claim 11, wherein the UE capability information further indicates a maximum number of non-overlapped CCEs that the UE is configured to monitor per slot when the UE is configured for carrier aggregation operation over multiple downlink cells.

15. The medium of claim 11, wherein the RRC message further comprises a maximum number of monitored PDCCH candidates in a span for combination (X, Y) for a downlink bandwidth part (BWP) with subcarrier spacing (SCS) configuration $\mu$ for a cell.

16. The medium of claim 11, wherein the RRC message limits configuration of common search space (CSS) sets that result in corresponding total, or per scheduled cell, numbers of monitored PDCCH candidates and non-overlapped control channel elements (CCEs) per slot or per span to not exceed the corresponding maximum numbers per slot or per span, respectively.

17. The medium of claim 11, wherein for a set of PDCCH candidates for the UE to monitor for all search space sets within a slot or within a span in the slot, where Suss is a set of UE-specific search space (USS) sets with a cardinality of Juss, a location of USS sets, $0 \le j < Juss$ in Suss is according to an ascending order of a search space set index.

18. A non-transitory computer-readable storage medium that stores instructions for execution by one or more processors of a user equipment (UE), the instructions when executed configure the one or more processors to:
send, to a $5^{th}$ generation NodeB (gNB), UE capability information indicating a capacity to monitor a physical downlink control channel (PDCCH), the UE capability information indicating whether the UE has a carrier aggregation capability over multiple downlink cells, the UE capability information further indicating a maximum number of PDCCH candidates that the UE is configured to monitor per span when the UE is configured for carrier aggregation operation over multiple downlink cells;
receive, from the gNB based on the UE capability information, a radio resource control (RRC) message comprising an indication to monitor a PDCCH on a serving cell for the maximum number of PDCCH candidates, the indication comprising one of a per slot indication and a per span indication; and
expect to be configured, by the RRC message, common search space (CSS) sets that result in not more than corresponding total, or per scheduled cell, numbers of monitored PDCCH candidates and non-overlapped CCEs per slot or per span that exceed the corresponding maximum numbers per slot or per span, respectively.

19. The medium of claim 18, wherein the RRC message further comprises a maximum number of monitored PDCCH candidates in a span for combination (X, Y) for a downlink bandwidth part (BWP) with subcarrier spacing (SCS) configuration µ for a cell.

20. The medium of claim 18, wherein the instructions when executed configure the one or more processors to monitor, for a set of PDCCH candidates, for all search space sets within a slot or within a span in the slot, where Suss is a set of UE-specific search space (USS) sets with a cardinality of Juss, a location of USS sets, $0 \leq j < J_{uss}$ in Suss is according to an ascending order of a search space set index.

* * * * *